United States Patent [19]
Schein et al.

[11] Patent Number: 6,002,394
[45] Date of Patent: *Dec. 14, 1999

[54] SYSTEMS AND METHODS FOR LINKING TELEVISION VIEWERS WITH ADVERTISERS AND BROADCASTERS

[75] Inventors: Steven M. Schein, Menlo Park; Sean A. O'Brien, San Jose; James Jay Leftwich, Palo Alto; Susan Broughton, Tracy, all of Calif.

[73] Assignee: StarSight Telecast, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,078

[22] Filed: Apr. 11, 1997

Related U.S. Application Data

[63] Continuation-in-part of application No. 08/537,650, Oct. 2, 1995, abandoned.
[60] Provisional application No. 60/022,826, Jul. 26, 1996, and provisional application No. 60/015,648, Apr. 19, 1996.

[51] Int. Cl.$^6$ .............................. H04N 7/10; H04N 7/14
[52] U.S. Cl. .............................. 345/327; 348/13; 348/12; 348/10; 348/6
[58] Field of Search ................................. 348/13, 12, 10, 348/6, 7, 2, 906; 455/6.3, 5.1, 3.1, 2; H04N 7/10, 7/14

[56] References Cited

U.S. PATENT DOCUMENTS

| | | |
|---|---|---|
| 4,787,063 | 11/1988 | Muguet . |
| 5,155,591 | 10/1992 | Wachob . |
| 5,223,924 | 6/1993 | Strubbe . |
| 5,335,277 | 8/1994 | Harvey et al. . |
| 5,353,121 | 10/1994 | Young et al. . |
| 5,359,367 | 10/1994 | Stockill . |
| 5,465,113 | 11/1995 | Gilboy . |
| 5,469,206 | 11/1995 | Strubbe et al. . |
| 5,479,266 | 12/1995 | Young et al. . |
| 5,481,296 | 1/1996 | Cragun et al. . |
| 5,483,278 | 1/1996 | Strubbe et al. . |
| 5,502,504 | 3/1996 | Marshall et al. . |
| 5,523,796 | 6/1996 | Marshall et al. . |
| 5,534,911 | 7/1996 | Levitan . |
| 5,559,549 | 9/1996 | Hendricks et al. ........................ 348/12 |
| 5,572,442 | 11/1996 | Schulhof et al. ........................... 348/7 |
| 5,589,892 | 12/1996 | Knee et al. .............................. 348/906 |
| 5,600,364 | 2/1997 | Hendricks et al. . |
| 5,635,979 | 6/1997 | Kostreski et al. ........................ 348/13 |
| 5,657,072 | 8/1997 | Aristides et al. ....................... 348/906 |
| 5,663,757 | 9/1997 | Morales .................................... 348/13 |
| 5,666,293 | 9/1997 | Metz et al. ................................. 348/7 |
| 5,677,708 | 10/1997 | Matthews, III et al. ............... 348/906 |
| B1 4,706,121 | 12/1993 | Young . |

FOREIGN PATENT DOCUMENTS

WO 95/28055   10/1995   WIPO .

OTHER PUBLICATIONS

VideoGuide, "VideoGuide User's Manual," pp. 1–27 (p. 11 is the most relevant).

*Primary Examiner*—Nathan Flynn
*Assistant Examiner*—Vivek Srivastava
*Attorney, Agent, or Firm*—Christie, Parker & Hale, LLP

[57] ABSTRACT

The present invention provides systems and methods for providing television schedule information to a viewer, and for allowing the viewer to link, search, select and interact with information in a remote database, e.g., a database on the internet. The television schedule information can be displayed on a variety of viewer interfaces, such as televisions screens, computer monitors, PCTV screens and the like. The television schedule information may be stored on the viewer's computer, television, PCTV, or a remote server (e.g., a website), or the television schedule information may be downloaded from a remote database to the viewer's computer, television or PCTV.

19 Claims, 26 Drawing Sheets

FIG. 5
CHANNEL DATA TABLE

| Offset | 7 | 6 | 5 | 4 | 3 | 2 | 1 | 0 |
|---|---|---|---|---|---|---|---|---|
| 0x00 | colspan=6: TYPE=0x01 | | | | | | 0x00 | |
| 0x01 | colspan=8: NBR BLOCKS | | | | | | | |
| 0x02 | colspan=8: 0x00 | | | | | | | |
| 0x03 | colspan=8: NBR CHANNELS | | | | | | | |
| 0x04 | MSB — CHANNEL ID — LSB | | | | | | | |
| 0x06 | DPF | ICF | NDF | colspan=3: | | | NF | TMSB |
| 0x07 | colspan=8: TUNE CHANNEL NBR | | | | | | | |
| 0x08 | colspan=8: TRANSPONDER NBR | | | | | | | |
| 0x09 | colspan=8: SATELLITE NBR | | | | | | | |
| 0x0A | colspan=2: SOURCE | | colspan=4: CHANNEL TYPE | | | | NMSB |
| 0x0B | colspan=8: NATIVE CHANNEL NBR | | | | | | | |
| 0x0C | colspan=8: NAME MASK BITS | | | | | | | |
| 0x0D | colspan=8: FAVORITES LINK | | | | | | | |
| 0x0E | MSB — SHOWLIST HANDLE TABLE HANDLE — LSB | | | | | | | |
| 0x10 | MSB — NAME AFFILIATION STRING — LSB | | | | | | | |
| 0x18 | MSB — DUPLICATE CHANNELS HANDLE — LSB | | | | | | | |
| | colspan=8: 0x14 | | | | | | | |

FIG. 6
SHOW LIST

| Offset | 7 | 6 | 5 | 4 | 3 | 2 | 1 | 0 |
|---|---|---|---|---|---|---|---|---|
| 0x00 | colspan=8: TYPE=0x02 | | | | | | | |
| 0x01 | colspan=8: NBR BLOCKS | | | | | | | |
| 0x02 | colspan=8: VERSION | | | | | | | |
| 0x03 | MSB — START TIME GMT — LSB | | | | | | | |
| 0x07 | colspan=8: START DELIMITER=0xEE | | | | | | | |
| 0x08 | RESV | colspan=2: | | PPV | GRPF | DIDF | DMYF | 0x00 |
| 0x09 | colspan=8: DURATION | | | | | | | 0x01 |
| 0x0A | MSB — SHOW TITLE HANDLE — LSB | | | | | | | 0x02 |
| 0x0C | MSB — SHOW DESCRIPTION HANDLE — LSB | | | | | | | 0x04 |
| 0x0E | MSB — GROUP ID — LSB | | | | | | | 0x06 |
| | colspan=8: END DELIMITER=0xFF | | | | | | | |

FIG. 7A

SHOW TITLE ENTRY

| | 7 | 6 | 5 | 4 | 3 | 2 | 1 | 0 |
|---|---|---|---|---|---|---|---|---|
| 0x00 | TYPE=0x50 | | | | NBR BLOCKS | | | |
| 0x01 | CMPF | CCF | SF | BW/C | RF | REF CNT MSB'S | | |
| 0x02 | REFERENCE COUNT | | | | | | | |
| 0x03 | MSB | | | THEME INDEX ID | | | | LSB |
| 0x05 | SHOW TITLE TEST | | | | | | | |

FIG. 7B

SHOW DESCRIPTION ENTRY

| | 7 | 6 | 5 | 4 | 3 | 2 | 1 | 0 |
|---|---|---|---|---|---|---|---|---|
| 0x00 | TYPE=0x60 | | | | NBR BLOCKS | | | |
| 0x01 | CMPF | CCF | SF | BW/C | RF | REF CNT MSB'S | | |
| 0x02 | REFERENCE COUNT | | | | | | | |
| 0x03 | MSB | | | THEME INDEX ID | | | | LSB |
| 0x05 | CRITICS RATING | | | | MPAA | | | |
| 0x06 | TRAITS MASK BITS | | | | | | | |
| 0x07 | YEAR PRODUCED | | | | | | | |
| 0x08 | SHOW DESCRIPTION TEXT | | | | | | | |

FIG. 8

THEME CATEGORY TABLE

| | 7 | 6 | 5 | 4 | 3 | 2 | 1 | 0 |
|---|---|---|---|---|---|---|---|---|
| 0x00 | | | | TYPE=0x05 | | | | |
| 0x01 | | | | NBR BLOCKS | | | | |
| 0x02 | | | | VERSION | | | | |
| 0x03 | | | | NBR THEME CATEGORIES | | | | |
| 0x04 | | | | THEME CATEGORY ID | | | | |
| 0x05 | | | | ATTRIBUTES FLAG | | | | |
| 0x06 | MSB | | | THEME SUBCATEGORY | | | | |
| 0x07 | | | | HANDLE TABLE | | | | LSB |
| 0x08 | | | | CATEGORY NAME LENGTH | | | | |
| 0x09 | MSB | | | THEME CATEGORY NAME | | | | |
| ... | ... | | | | | | | ... |
| 0x0M | | | | | | | | |
| ... | ... | | | | | | | ... |

FIG. 9

THEME SUBCATEGORY TABLE

| | 7 | 6 | 5 | 4 | 3 | 2 | 1 | 0 |
|---|---|---|---|---|---|---|---|---|
| 0x00 | | | | TYPE=0x06 | | | | |
| 0x01 | | | | NBR BLOCKS | | | | |
| 0x02 | | | | THEME CATEGORY ID | | | | |
| 0x03 | | | | NBR THEME SUBCATEGORIES | | | | |
| 0x04 | | | | THEME SUBCATEGORY ENTRY LENGTH(m) | | | | |
| 0x05 | | | | ATTRIBUTES FLAG | | | | |
| 0x06 | | | | NBR THEME INDECIES(k) | | | | |
| 0x07 | MSB | | | THEME ID 1 | | | | LSB |
| 0x09 | MSB | | | THEME ID 2 | | | | LSB |
| ... | ... | | | | | | | ... |
| 6+2k | MSB | | | THEME ID k | | | | LSB |
| 8+2k | MSB | | | THEME SUBCATEGORY NAME | | | | |
| ... | ... | | | | | | | ... |
| 0xm | | | | | | | | LSB |
| ... | ... | | | | | | | ... |

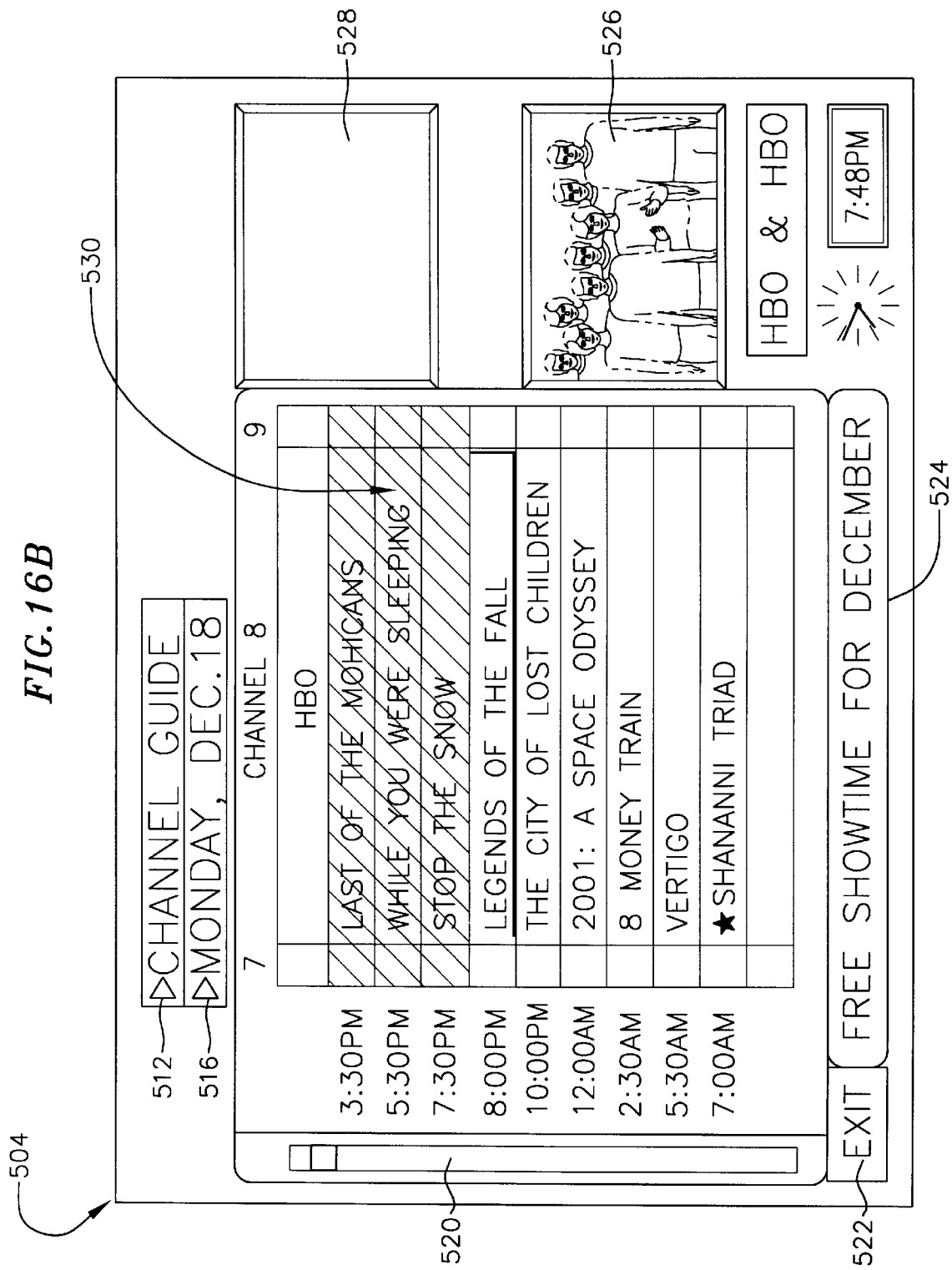

FIG. 18C

ENTERING PASSWORD
BY ENTERING YOUR PASSWORD YOU ARE CONFIRMING A PURCHASE OR VALIDATION OF YOUR ID. PLEASE ENTER YOUR PASSWORD TO ORDER THIS MOVIE FOR THE LISTED PURCHASE PRICE.

HELP: PASSWORD
(1) INFO ON (LEGENDS OF THE FALL)          $3.95

ENTER PASSWORD FOR DELIVERY IN 7 MINUTES
@ 7:55PM     LEGENDS OF THE FALL—$3.95

• • • • • • • • • •

(2) ACCEPT PASSWORD...
(<) BACK TO PREVIOUS MENU (0) GO BACK TO PROGRAM GUIDE

FIG. 18D

CONFIRMING YOUR PURCHASE
YOU HAVE SUCCESSFULLY ENTERED YOUR PASSWORD.
CLICKING ON "YES" ITEM WILL FINALIZE YOUR PURCHASE.

HELP: CONFIRMING YOUR PURCHASE
(1) INFO ON (LEGENDS OF THE FALL)          $3.95

YOU HAVE SUCCESSFULLY ENTERED YOUR PASSWORD. ARE YOU SURE YOU WANT TO PROCEED TO FINALIZE YOUR ORDER ?

(2) YES
(<) NO (BACK TO PREVIOUS MENU)

(0) GO BACK TO PROGRAM GUIDE

FIG.21D

ENTERING PASSWORD
BY ENTERING YOUR PASSWORD YOU ARE CONFIRMING A PURCHASE OR VALIDATION OF YOUR ID. PLEASE ENTER YOUR PASSWORD TO ORDER THIS ITEM FOR THE LISTED PURCHASE PRICE.

HELP: PASSWORD
(1) INFO ON (OFFICIAL NFL CAP)         $9.95

ENTER PASSWORD FOR DELIVERY VIA U.P.S.
OFFICIAL NFL CAP-WA REDSKINS-$9.95
| • • • • • • • • • • •

(2) ACCEPT PASSWORD...
(<) BACK TO PREVIOUS MENU (0) GO BACK TO PROGRAM GUIDE

FIG.21E

HELP: CONFIRMING YOUR PURCHASE
(1) INFO ON (OFFICIAL NFL CAP)         $9.95

YOU HAVE SUCCESSFULLY ENTERED YOUR PASSWORD. ARE YOU SURE YOU WANT TO PROCEED TO FINALIZE YOUR ORDER ?

(2) YES
(<) NO (BACK TO PREVIOUS MENU)

(0) GO BACK TO PROGRAM GUIDE

FIG.21F

OFFICIAL NFL CAP
A GOOD-LOOKING ACCESSORY FOR ANY FAN. YOUR FAVORITE NFL TEAM LOGO EMBROIDERED ON A TOP-QUALITY ALL-COTTON CAP. COMES IN TEAM COLORS.
                         SPECIAL OFFER-$9.95

SPORTS: FOOTBALL
(1) MORE INFORMATION

YOUR ORDER CONFIRMED !
12.15.95   OR.#950384271   IT.#3452NP
ACCOUNT 234.95430      PURCHASE: $9.95

(2) OK (BACK TO PREVIOUS MENU)
(3) GO TO YOUR LIST OF PURCHASES (0) GO BACK TO PROGRAM GUIDE

SYSTEMS AND METHODS FOR LINKING TELEVISION VIEWERS WITH ADVERTISERS AND BROADCASTERS

CROSS-REFERENCE TO RELATED APPLICATION

This application is a continuation-in-part of Provisional patent application Ser. Nos. 60/022,826, filed on Jul. 26, 1996, and 60/015,648, filed on Apr. 19, 1996, and U.S. patent application Ser. No. 08/537,650, filed on Oct. 2, 1995, now abandoned, the complete disclosures of which are incorporated herein by reference. This application is also related to U.S. Patent Application Serial No. unassigned, filed Apr. 11, 1997 (Attorney Docket No. 14774-004410), and its Appendices A, B, and C, the complete disclosure which is also incorporated herein by reference.

BACKGROUND OF THE INVENTION

The present invention generally relates to systems and methods for providing information to television viewers, and more particularly to systems and methods for allowing the viewer to retrieve, search, select and interact with television schedule information located in a remote database, computer network or on-line service, e.g., a network server on the Internet or World Wide Web.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased. Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges and opportunities. One such challenge and opportunity is to provide viewers with additional information associated with a particular program in the television guide. As a television viewer is browsing through the television programs, he or she may wish to obtain more information relating to specific areas of interest or concerns associated with the show, such as the actors, actresses, other movies released during the same time period, or travel packages or promotions that may be available through primary, secondary or third party vendors. Offering this type of information to the television viewer can be difficult, however, because their are hundreds of different programs broadcast every day. In addition, the available information changes at a rapid pace, which makes it even more difficult to provide this information in present television schedule guides.

In television broadcasting, it may also be desirable to interact with the viewer. There are many commercials and programs which request viewer action such as purchasing an advertised product, making a monetary contribution, responding to a survey, answering a question, or participating in contests with other viewers, for example. One problem with this existing system is that it is often difficult to motivate a viewer to request information or send in a contribution after the broadcast of the commercial or program. Viewers will often forget the advertisement or simply lose motivation to spend money or request information after the commercial or program is over. Another problem is that companies sponsoring these commercials or programs would often like to provide their viewers with further information, if the viewers could be identified or if the viewer requests the additional information. Thus, it would be desirable to provide a ready and efficient method to facilitate an exchange of information between television viewers and producers, promoters and advertisers during the broadcast of the commercial or program.

SUMMARY OF THE INVENTION

The present invention provides systems and methods for providing television schedule information on a visual interface, and for allowing the viewer to retrieve, search, select and interact with information located in a remote database, computer network or on-line service, such as a network server on the Internet or World Wide Web. The television schedule information can be displayed on a variety of visual interfaces, such as televisions screens, computer monitors, PCTV screens and the like. The television schedule information may be stored on the viewer's computer, television, PCTV, or a remote server (e.g., a website), or the television schedule information may be downloaded from a remote database or computer network to the viewer's computer, television or PCTV. The present invention also provides systems and methods for allowing the viewer to navigate and interact with a program guide that is displayed, for example, on the viewer's television screen. The program guide will usually include a schedule information area that depicts the programs that are being presented on each channel at each time during the day, week or month. With an input device, such as a remote control device, pointing device, mouse, keyboard, microphone or the like, the viewer can browse through the schedule information area and/or obtain more information about programs of particular interest.

In an exemplary embodiment of the present invention, a system and method is provided for directly linking television viewers with broadcasters and advertisers during the real-time broadcast or non-real-time internet broadcast of a commercial or program. In this embodiment, the system includes a viewer interface, such as a television, computer, PCTV or a television coupled to a computer system, and a communication device for coupling the viewer interface with a computer network, such as the Internet or World Wide Web. A television guide database or network server is coupled to the computer network, or directly to the viewer interface for providing the television schedule and/or listing information to the viewer. The viewer interface will have a memory and a processor with appropriate software (not shown) for searching, retrieving, initiating a subscription to and interacting with information from the television guide database, or the commercial databases coupled to the computer network. Alternatively, this function may be provided through the computer network by allowing the viewer to access, download, and/or automatically upgrade an application or applet (e.g., a JAVA™ applet) having appropriate software to run the television schedule and/or listing information guide on a display.

In the above embodiment, commercial providers (e.g., Budweiser) and/or television station broadcasters (e.g., ABC) and/or program directory, library, or archival sources (e.g., Turner Classics Film Library or other such repository of digitally-available programs or programming) may also have databases coupled to the viewer interface. In this manner, the viewer may directly access these databases during the broadcast of a television program, or while the viewer is browsing through the television schedule and/or listing information guide. For example, the viewer may purchase goods and services directly through the commercial sponsor, or through a delivery system provided by the television schedule and/or listing information guide. This type of advertising allows the advertiser to directly target a particular program, and it allows the viewer to directly purchase the products during the advertisement or associated program. Consequently, viewers will not forget the advertisement or simply lose motivation to spend money or request information and/or related products, offers, and services after the commercial or program is over.

BRIEF DESCRIPTION OF THE DRAWINGS

FIG. 5 schematically illustrates a channel data table for the data structure of FIG. 4.

FIG. 6 illustrates a show list data table for the data structure of FIG. 4.

FIGS. 7A and 7B illustrate show title entries and show description entries, respectively, for the data structure of FIG. 4.

FIGS. 8 and 9 illustrate theme catagory entries and them subcategory entries, respectively, for the data structure of FIG. 4.

FIGS. 16A and 16B are schematic views of a representative program guide and a channel guide, respectively, for use with the television system of FIG. 1.

FIGS. 18A–18E illustrate a Video On Demand menu and an associated submode menu.

FIGS. 21A–21F illustrate a system and method for contextually linking a program to a database on a computer network.

DESCRIPTION OF THE SPECIFIC EMBODIMENTS

The present invention provides systems and methods for providing television schedule and/or listing information to a viewer, and for allowing the viewer to link, search, select, retrieve, initiate a subscription to and interact with information in a remote database, computer network or on-line server, e.g., a network server on the Internet or World Wide Web. The television schedule and/or listing information can be displayed on a variety of viewer interfaces, such as televisions screens, computer monitors, PCTV screens and other interactive display devices. The television schedule and/or listing information may be stored on the viewer's computer, television, PCTV, or a remote server (e.g., a website), or the television schedule and/or listing information may be downloaded from a remote database or computer network and/or internet broadcast to the viewer's computer, television or PCTV. Suitable television schedule and/or listing information systems or video guides that can be used with the present invention are described in commonly assigned U.S. Pat. Nos. 5,353,121, 5,479,266, the complete disclosures of which are hereby incorporated by reference. The systems and methods of the present invention may also be useful with video guides available under the name of SuperGuide™ from The SuperGuide Corporation of Shelby, N.C.

Figure 1:
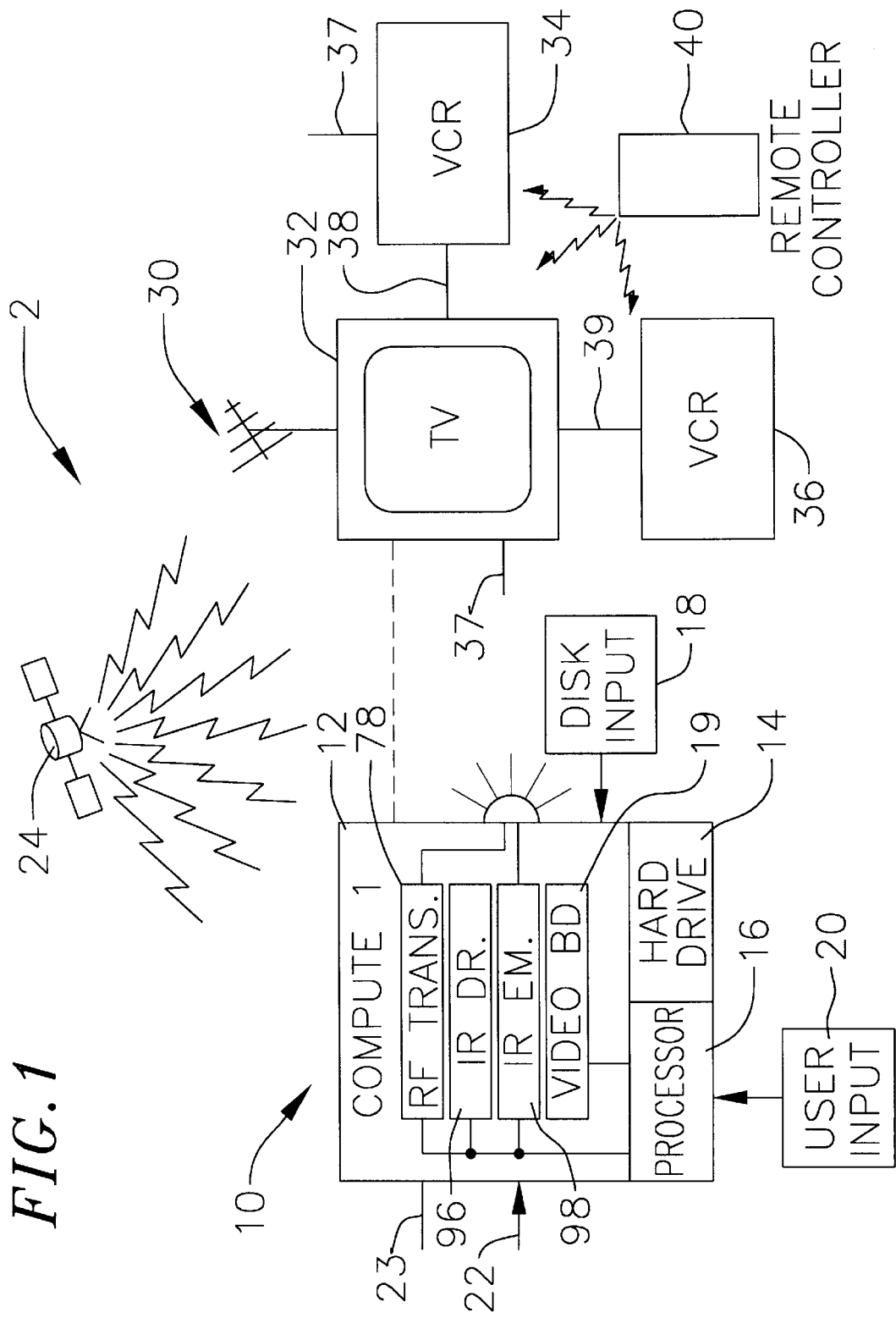
FIG. 1 is a schematic view of a representative interactive computer system coupled to a television system.

In one embodiment, the invention incorporates an interactive computer system which assists the viewer in utilizing television schedule and/or listing information and linking with a database to search and retrieve, initiate a subscription to, information. Preferably, the information is contextually related to television programs within the television schedule and/or listing information. Referring to the drawings in detail, wherein like elements are indicated by like numerals, a representative television schedule and/or listing information system 2 for use with the contextual linking system and method of the present invention is illustrated in FIGS. 1–7. As shown in FIG. 1, schedule system includes a computer system 10 coupled to a television system 30. Computer system 10 includes a standard computer 12 which is, for example, any available personal computer (e.g., IBM compatible, Macintosh, and the like). Computer 12 can also be located within a set-top box (e.g., a DSS box). Computer 12 contains a hard drive 14, a processor 16 and a disk input 18 for providing computer 12 with various, additional software. An input device 20 allows a viewer to interact with computer 12 and/or a television schedule guide (described below and illustrated in FIGS. 12–17). Line 23 is connected to an available serial, parallel or other data port 23 on computer 12. This line 23 is used to connect other devices/components to computer 12.

In another embodiment, computer system 10 may be combined with television system 30 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Alternatively, the television may be incorporated into the computer so that the computer monitor performs this dual function. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

Television system 30 includes a television 32, which may be any commercially available television, and a user input device 20. Television system 30 may or may not include a video tape recorder (VCR). In this embodiment, VCRs 34 and 36 are coupled to television 32. These VCRs 34 and 36 can be, for example, any commercially available VCRs or any other type of recording and/or storage device (analog or digital). Input device 20 allows the viewer to interact with television 32, VCR 34, and/or VCR 36. Input device 20 may be a remote control, keyboard, mouse, a voice activated interface or the like. A suitable input device for use with the present invention is described in U.S. Provisional applications Ser. Nos. 60/022,826, filed on Jul. 26, 1996, and 60/015,648, filed on Apr. 19, 1996 (Attorney Docket Nos. 14774-004000 and 005500), the complete disclosures of which are incorporated herein by reference. A line 37 is used to connect other devices to VCR 34. Other devices can also be connected in series between VCR 34 and television 32 via line 38. With this configuration, computer 12 (or computer system 10) and television 32 (or television system 30) can be located in different rooms within a private residence or a commercial building.

In one embodiment, a computer program provided on diskettes, a CD ROM or other medium contains the software needed for receiving, organizing and displaying data for the television schedule guide. These diskettes are inserted in disk input 18 and the software for these diskettes is stored within computer 12 on hard drive 14 or on another mass storage location. This action can be performed by, for example, the user or a serviceperson. The computer program can also be provided access, download, and/or automatically upgrade, for example, via downloading from a satellite 24, transmission through the internet or other on-line service, or transmission through another type of land line 22 (e.g., coax cable, telephone line, optical fiber, or wireless technology (e.g., Richochet™)).

In addition to the computer program, data for the basic schedule information and other related data (e.g., data relating to a particular show) are needed for the generation and maintenance of the television schedule and/or listing information guide. These data are received, in the preferred embodiment, via line 22; they can also be provided via a satellite broadcast from satellite 24 or wireless technology (e.g., Richochet™). Additionally, the television schedule and/or listing information and related data can be sent directly to television 32 via satellite 24 or wireless technology (e.g., Richochet™). In this arrangement, the television schedule information and related data does not have to be transmitted from computer system 10 to television system 30.

In one embodiment, line 22 is a telephone line which provides access to the internet or other on-line service via, for example, a regular modem or direct modem access to a schedule provider. The schedule data are then provided to the viewer from a remote database via the internet or other on-line service, or directly from the service provider. As stated above, line 22 can also be, for example, coax cable, optical fiber or any other land line which can provide data to computer 12. The software program saved on hard drive 14 then utilizes the data received on line 22 to generate a television schedule guide. The user can retrieve this generated television schedule guide when desired.

1. OVERVIEW OF A PREFERRED EPG SYSTEM

Figure 2:
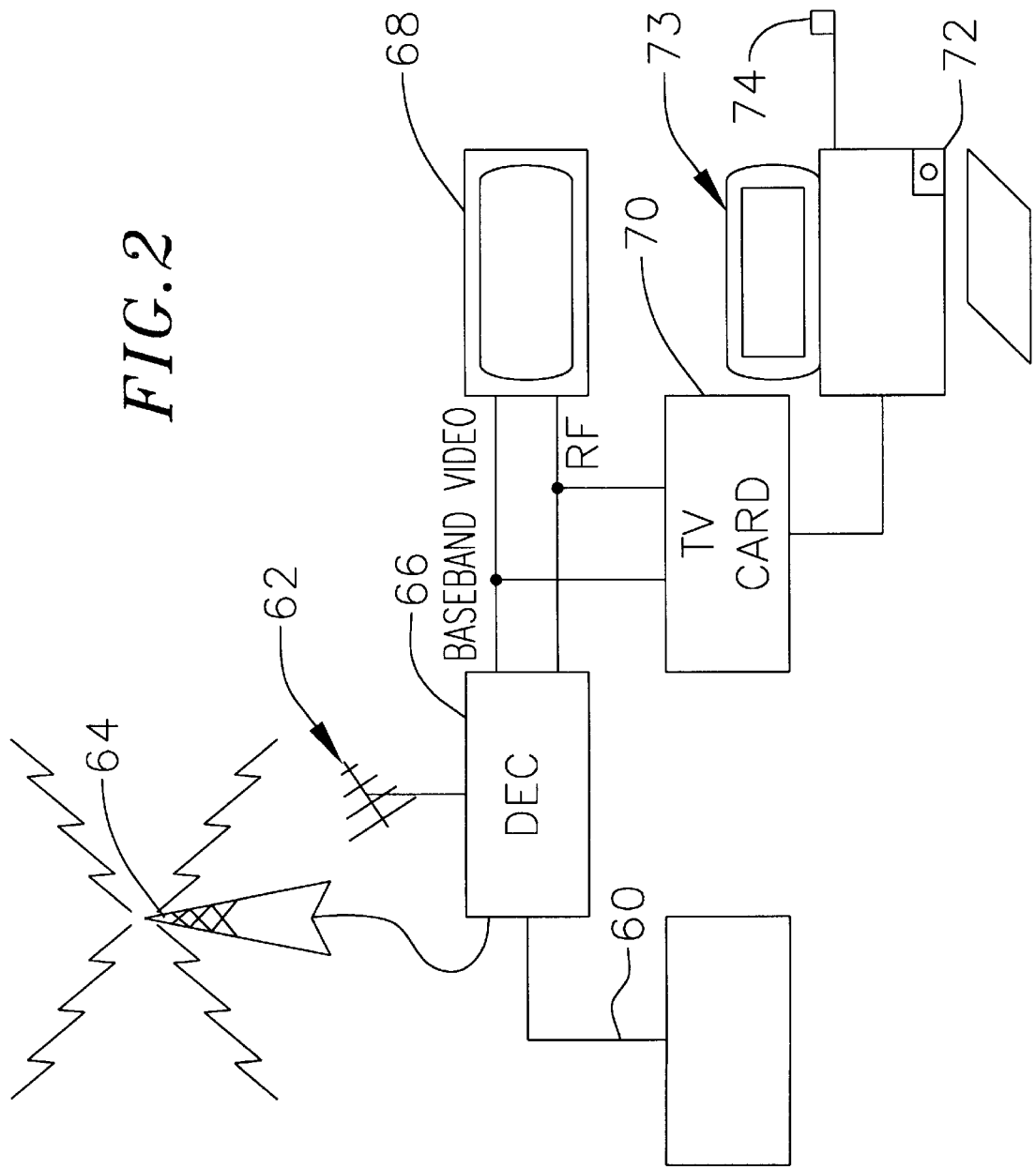
FIG. 2 illustrates another exemplary television system for use with an electronic program guide according to the present invention.

In a preferred embodiment, the electronic program guide of the present invention may be implemented either on a personal computer, a PCTV, a television connected to a set-top box, or a television including a custom board. However, the invention is not limited to any particular hardware configuration and will have increased utility as new combinations of computers and television systems are developed. In the following any of the above will sometimes be referred to as a "TV system". Block diagrams of representative TV systems are depicted in FIG. 2. Details of implementation are not depicted because the invention is not limited to any particular TV system.

As is well known, the picture to be displayed may be transmitted as an analog signal, for example according to the NTSC standard utilized in the United States, or as a digital signal modulated onto an analog carrier. The signals may be received over a cable, or via an antenna or satellite dish. Typically, television sets are designed to receive analog signals and computers display devices are designed to display pictures encoded in a digital format. However, decoder system converts the digital data to an analog signal for display on a television set and TV modems can format analog TV signals for display on a monitor.

In FIG. 2, analog or digital TV signals, received via cable 60, antenna 62, or satellite dish 64, are provided to a television system. If the signal is from a digital broadcast service, then a decoder 66 converts the signal to baseband video and audio or channel ¾ RF. If the signal is an analog signal, it is passed through as a live video output. The television system 68, depending on its configuration, receives selected ones of the outputs and displays the received program.

A PCTV includes a TV card 70, connected to either live video, baseband video, or channel 3/4 output, digitizes the video image and displays the video image in a resizeable window on the computer monitor. The PCTV is also coupled to land telephone lines by a modem 72.

If the received signal is an analog TV signal the TV card of the PCTV digitizes the analog signal and extracts included information from the vertical blanking intervals. On the other hand, if the signal is a digital signal, separate audio, video, VBI (vertical blanking information such as closed caption, teletext, and program related information), program guide, and conditional access information are provided as separate bitstreams. The video and audio bitstreams for programs are converted to a format for display and the program guide information is processed to form program guide database. The processor, executing software stored in memory, generates interactive electronic program guide images and images of received programs. The guide can be used to interact with and control programs displayed in the window.

A television system configured to display an electronic program guide such as a guide provided by StarSight telecast includes an on-screen display controller and other hardware described below. If a standard analog broadcast signal is received program guide data is extracted from the VBI by a VBI data slicer and processed to form a program database. If a DBS digital signal is received, either from a satellite or cable, VBI and program data are provided in separate bit streams. The program guide images are generated are either generated locally or remotely and provided to an on screen display controller. Interactivity is provided via a remote control.

Alternatively, the program guide can be displayed on a computer monitor 83 that interactively controls the television set through, for example, an IR interface including an IR blaster 84 to generate IR codes to control the television and/or a VCR.

If the electronic guide database is generated locally, the system for creating the electronic programming guide must receive television schedule information and process the received information to create a database. Thus, the system usually requires, a data reception unit, a processor, memory to store program code and a database, an on-screen display generator (OSD), and a control interface for tuning to selected channels.

In one preferred embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 3:
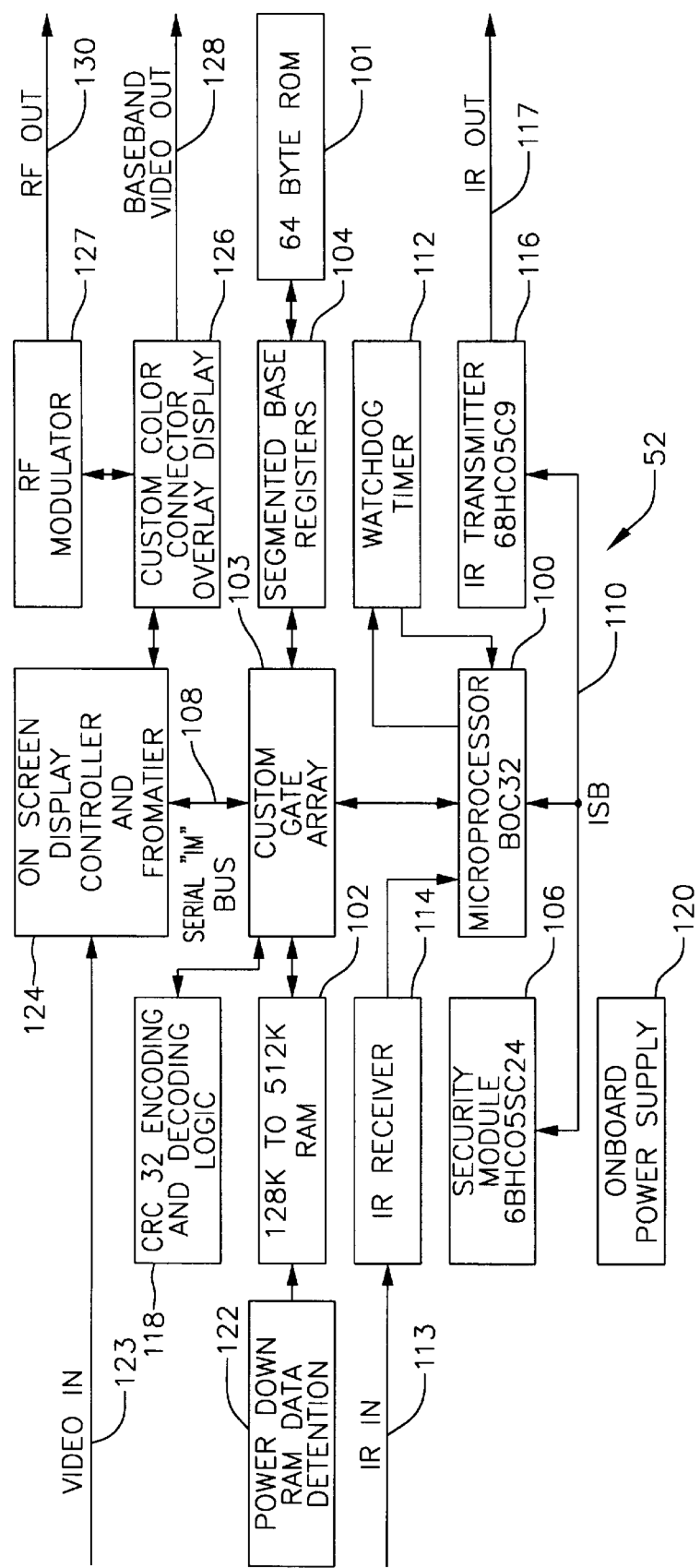
FIG. 3 is a block diagram of an exemplary electronic hardware unit utilized to perform the electronic on-screen schedule display and other functions for the electronic program guide of the present invention.

In a preferred embodiment, a board is included at a viewer's television set and the database is stored locally and commands are transmitted in the VBIs of programming on a designated channel, for example PBS. An example of a board for receiving program guide information, generating program guide database, displaying the program guide, and interactively controlling the program guide is depicted in FIG. 3. The commands are transmitted to the board in the vertical blanking intervals of programming broadcast on a designated channel.

Alternatively, the commands could be transmitted to the local unit over land telephone lines. Additionally, as described below, the database may be built remotely and the guide itself transmitted to the local unit.

Figure 4:
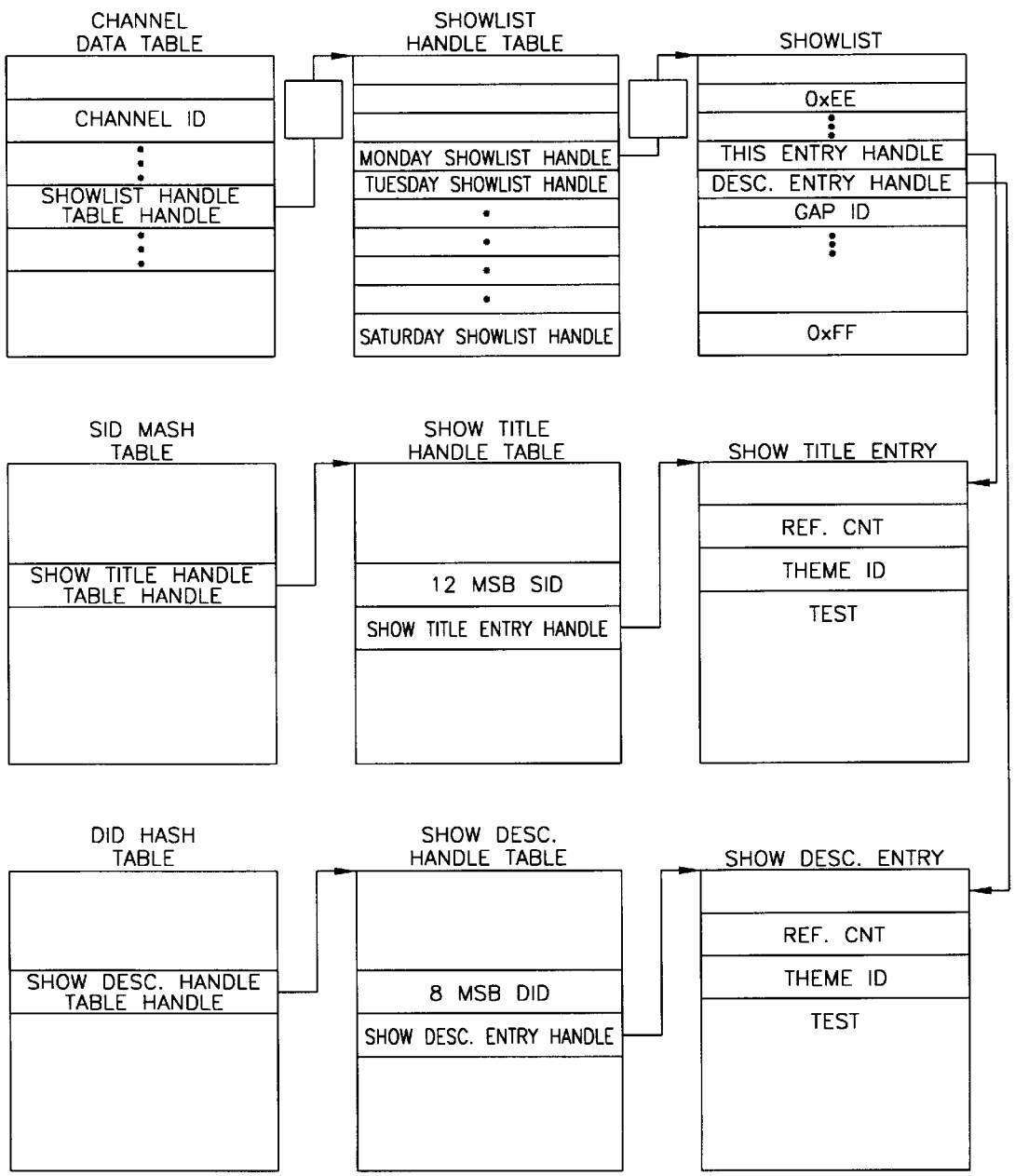
FIG. 4 illustrates a hierarchical structure of a database for the electronic hardware unit of FIG. 3.

The database engine builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where items of the database are stored.

In another embodiment, for example a DSS system, program guide data is transmitted as a bit stream that is processed by the database engine.

Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement database is also created from commands including advertising text and logos including IDs for linking the advertisements to shows displayed in the EPG. The user may access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode the display is a grid of character codes which are transferred to the OSD controller which generates the on-screen display.

An input-response user interface program module responds to user input to generate new displays responsive to the particular input. In one preferred embodiment, the user utilizes an input device, e.g., a remote control, mouse, voice activated interface or keyboard, to place a pointer over a part of the current display and clicks. A suitable input device for use with the present invention is described in U.S. provisional applications Ser. Nos. 60/022,826, filed on Jul. 26, 1996, and 60/015,648, filed on Apr. 19, 1996 (Attorney Docket Nos. 14774-004000 and 005500), the complete disclosures of which are incorporated herein by reference. The input-response module responds to the position of the pointer and the particular display currently displayed to generate a responsive display or take a particular action. In another preferred embodiment the user interface responds to function buttons on a remote control. Specific examples will be described below.

2. DETAILED DESCRIPTION OF THE EPG SYSTEM

FIG. 3 is a block diagram of an embodiment of the electronic hardware unit 52 utilized to perform the electronic on-screen schedule display and other functions. The particular hardware unit 52 depicted is for TVRO (TV Receive Only) customers having home satellite dishes for television viewing. This unit is coupled in series with existing customer TVRO equipment.

In FIG. 3, the unit receives Baseband Video in 123 from the customer TVRO system. The unit optionally outputs Baseband Video out 128 or channel ¾ RF out 130. The unit includes an 8-bit microprocessor 100, 64 bytes of code ROM 101, 512K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, choice of Baseband Video or RF outputs 128 or 130.

The on-screen display controller and formatter (OSDCF) 124 functions as an I/O controller, an on-screen display controller (OSD), and also as a closed-caption data (CCD) VBI data slicer. The VBI (vertical blanking interval) is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog to digital convertor (ADC) which digitizes the incoming baseband video and extracts digital information transmitted in the VBIs. As explained more fully below, messages for transmission to the database are transmitted in the VBIs. These messages are transferred to the processor 100 which executes a data base engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD which the generates a local video signal that causes the display screen to be displayed on the television screen.

3. SCHEDULING DATA STRUCTURES

The DBE builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where structures of the database are stored.

The hierarchy for the schedule data structures, in descending order, is:

Channel Data Table: contains subscriber unit's list of channels;
Show List: contains time slots for each show scheduled to be broadcast for a channel;
Show Title: contains the title text and show title attributes;
Show Description: contains show's ratings, attributes, and description text.

A channel data table, depicted in FIG. 5, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

The next data structure in the hierarchy is the show list depicted in FIG. 6. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of show list and adding duration values.

The database, when fully constructed, holds a weeks worth of show lists for each channel. The days of the week are accessed by incrementing the show list handle by two bytes. The show lists are updated each day at midnight GMT with the show list for the day just completed being deleted and the show list for same day next week being added to the database.

The next data structures in the schedule hierarchy are the show title entries, depicted in FIG. 7A and show description entries, depicted in FIG. 7B. For a given show slot the show title entry and show description entry are accessed utilizing the handles included in the slot. The show title and show description entries are stored in a memory pool divided into blocks. Each show title is identified by a unique 20-bit show identification number (SID) and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes theme index ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry incudes a theme index ID, critics rating, MPAA rating for the show, traits mask bits, year produced, and show description text. Show description entries tend to have a shorter life than show title entries because a description is only valid for a particular episode of a series.

4. SCHEDULE SEARCH

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

5. FAVORITE CHANNEL LISTS

Referring back to FIG. 5, every entry in the channel data table includes a FAVORITE LINK field. This field includes a link to a next favorite channel and is utilized to form an ordered, linked list of channels in an order determined by the user.

The user interface and database engine provide screens to facilitate the ordering and selection of channels to be displayed in the guide. A link to the first channel in an ordered channel list is stored in memory. This link is utilized to access the channel table entry for the most favorite channel. The FAVORITE LINK in that channel is accessed and utilized to access the channel table entry for the next favorite channel and so on until a designated delimiter value, e.g., 0×00, indicates the end of the favorite channel list.

The capability of having more than one favorites list can be supported by having multiple FAVORITE LINK fields stored in each channel table entry.

6. THEME DATA STRUCTURES

A powerful feature of the database is the ability to group shows by theme. The theme IDs stored in the show title and show description entries are utilized to match particular shows to particular themes. For example, a viewer may want to see a listing of all comedy movies.

Each primary category, movies in the example above, has a theme category entry included in a theme category table, depicted in FIG. 8. A theme category entry includes a theme category ID, a handle for the subcategory handle table, and the theme category name. The theme category ID is used identify theme sub-categories, comedy in the example above, for this primary category.

Figure 10:
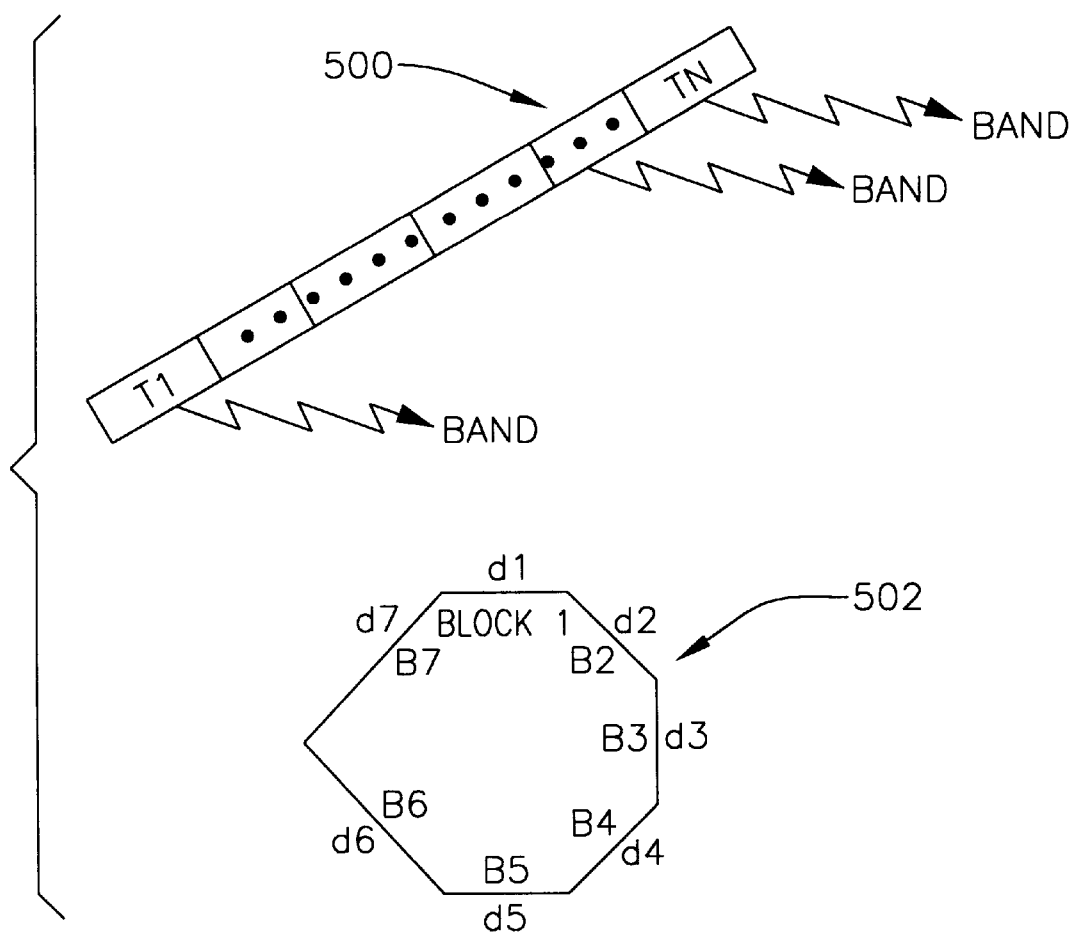
FIG. 10 illustrates an exemplary satellite for transmitting program information to the television system of FIG. 2.

There is a theme sub category table, depicted in FIG. 10, for each primary category. The table contains entries for each theme sub-category contained in a primary theme category. Each table entry includes the theme IDs corresponding to the sub-category entry and the name of the sub-category.

7. THEME SEARCH

When the viewer initiates a search for a particular type of show, for example a comedy movie, each channel is inspected and theme IDs of each show listed are compared to theme IDs stored in the comedy entry of the theme sub-category table corresponding to the movie primary category entry. Information about shows with matching theme IDs is stored in a theme search data structure in a user interface local buffer.

The theme search function requires two calls to the database. The first of these calls initializes the theme search data structure to the first show that matches the theme category for a specific channel entry, including the shows time offset from the search time. The second call will then find the next matching show after a particular offset time, updating the theme search data structure and returning the offset to the next show.

The basic algorithm for them user interface access is:
1. for a given starting time, for each channel entry, find the first show that matches the theme criteria on or during this time and create a list. Keep track of the channels that had matches;
2. sort the list of shows in time order;
3. find the channel with the earliest show in the sorted list;
4. place this earliest show into the user interface search list;
5. for the channel with the earliest show, request the next show that matches the theme criteria and updated offset time;
6. repeat steps 2–4 until all shows have been located or other specified limit is reached (i.e. search may be for a limited number of matches).

The shows for the selected category are then displayed in time order.

8. AD DATA STRUCTURES

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each add entry includes an ad banner text field, an ad text field, and a pointer to an ad logo, if appropriate. The ad logo includes a graphics file to be displayed with the ad.

9. BUILDING THE DATABASE

The data base is built by a data base engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The data base engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream.

In a DBS system video baseband signals are digitized, compressed, and modulated onto an analog carrier signals. Because of advances in the art of compression, a carrier once used to transmit a single program can now transmit four programs. Typically, in addition to video signals other bitstreams encoding information such as audio, VBI (vertical blanking information data such as closed caption and teletext), program guide information, and conditional access information are provided as separate bitstreams, multiplexed into a composite bit stream, and modulated onto a carrier signal.

Alternatively, the database itself may be transmitted in a digital data stream. For example, in DSS the program guide information is transmitted in block of 3 hours of programming for 36 channels. Programming is digitally modulated onto different bands. As depicted in FIG. 10, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted in as a carousel or endless loop so that there may be a delay before a particular time band is received.

A decoder at the viewers location receives 16 carriers and controls a tuner/demodulator to select one carrier. The carrier is sampled, decoded, error-corrected, and demultiplexed to separate the various bit streams. The decoder includes video decoder chips decompress compressed video to reconstruct pictures of virtually any size.

When the viewer accesses the guide the block for that time period is loaded into memory so that the user can interact with the guide. For a future time and different channel there may be a time delay. For example, if the current programming block were B1 and the block currently received is B4 the user must wait for blocks B5, B6, and B7, to be transmitted before the current programming can be received and displayed. The viewer would wait for a time delay equal to the sum of time durations for transmitting each block, i.e., d5+dG+d7. If the program guide block is modulated onto a different band the cable box must tune to the band and wait until the desired block is transmitted on the carousel. So if the guide is accessed for future programming there could be a delay.

For cable the database is built at the SST head end and sent over land-lines to the cable head end. Cable company sends data anyway it wants, VBIs, satellite, digital, etc.

10. USER INTERFACE

The user interface takes remote control commands as its primary input. In one embodiment a user requests various functions by pressing function buttons on a remote control.

In another embodiment, the GUI is utilized with different interactive regions on a displayed screen corresponding to different functions. The user moves the cursor over the interactive region corresponding to a desired function and selects the function to generate command. The particular form of entering a command is not critical and technology for utilizing voice commands may soon be available.

The user interface receives commands and responds with a requested display screen and by performing the function requested by the command. The function performed may be to perform an action such as recording a program, tuning to a channel, accessing a related internet site, purchasing a pay-per-view program, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to re-draw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer moves the cursor over the record interactive region which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by the on-screen display (OSD) controller based on graphic display commands issued by the database engine. Among the primitive commands need to draw system display screens are the Erase Screen Command; Draw Rectangle Command; Save Rectangle Command; Restore Rectangle Command; Move Rectangle Commands; Write ASCII String Command; and Draw Channel Icon Command.

Each screen includes areas that are constant and based on code and data stored in non-volatile memory and variable areas such as show titles and descriptions which utilize data stored in the database. As described above in the description of the database engine, the database is structured to facilitate efficient searching for information, generally in the form of ASCII text strings, stored in the database. Additionally, graphics files are also being stored in the database to be displayed in windows of the display screen.

Figure 11:
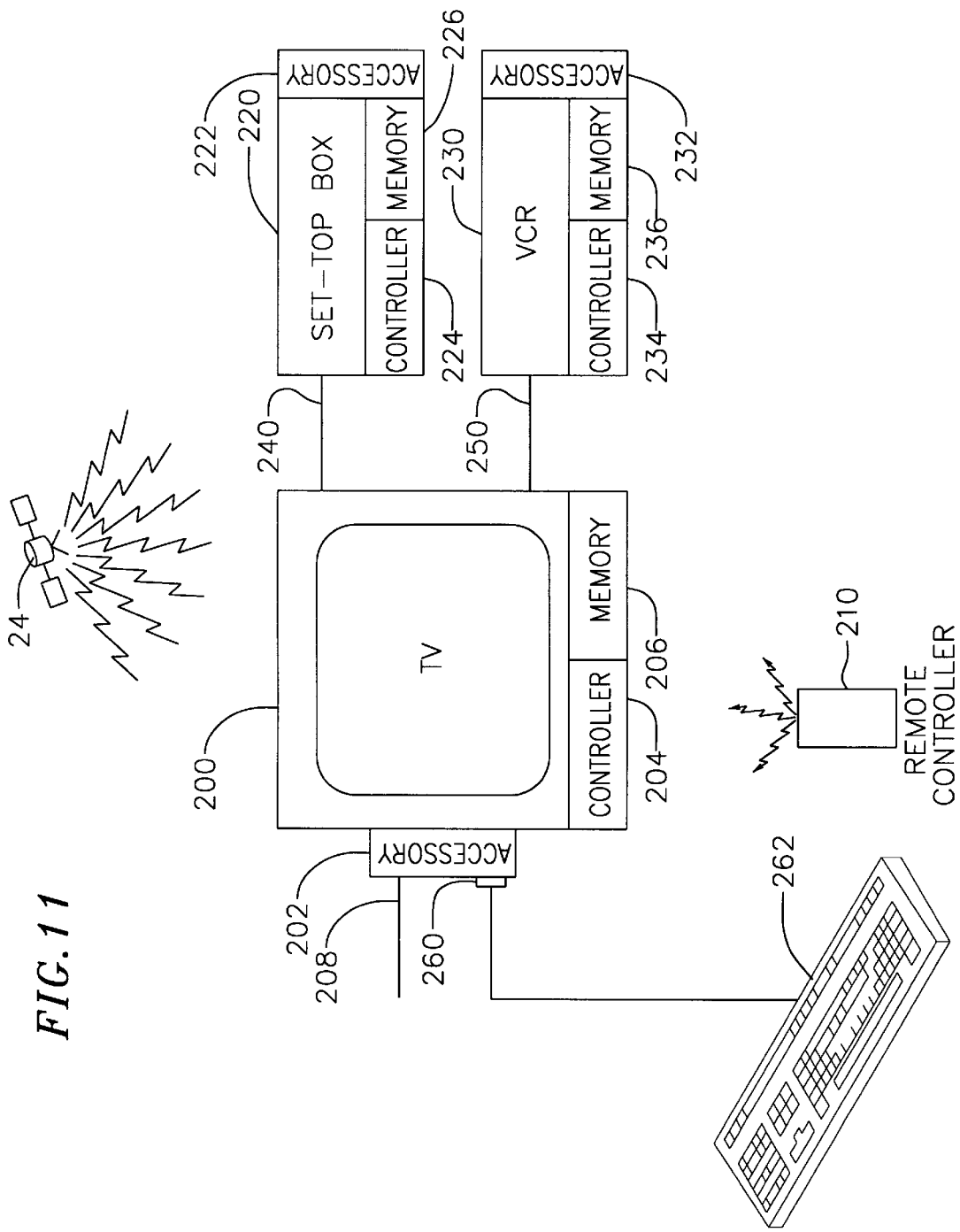
FIG. 11 illustrates several arrangements for providing television schedule information from a database to a television for display.

FIG. 11 illustrates several arrangements according to the present invention for providing television schedule information from an external database to a television for display. In one embodiment, on-line information providers (Prodigy, America On Line, Compuserve, MSN, AT&T, etc.) provide access to a database which contains the television schedule information. These on-line information providers can transmit data to television 200. In this embodiment, a modem within accessory 202 is utilized to provide the data. Accessory 202 is attached to television 200 and directly connected to telephone line 208 via the modem. The modem for access to the on-line service can also be located within television 200. Software, located either within accessory 202 or television 200, is used to search for and provide the data, along with providing several other features described below.

The available data, displayed on television 200, can emulate what a computer on-line user normally sees when accessing the internet through a personal computer. This television schedule data can also be further enhanced to "tie into" the televisions show that the user is viewing. Alternatively, accessory 202 may be replaced by accessory 222 which is attached to set-top box 220 (e.g., a cable box). The data provided via the on-line information provider is then transmitted to television 200 over line 240. Similarly, accessory 232, attached to VCR 230, can be used to obtain the television schedule data. The data would then be transmitted from VCR 230 to television 200 over line 250.

In another embodiment, the database with the television schedule information is located in memory 206 within television 200. Controller 204 is used to obtain the data from memory 206 so that it can be displayed on television 200. Alternatively, the database with the television schedule information could be located in memory 226 (within set-top box 220) or in memory 236 (within VCR 230). Controller 224 or controller 231 would be used to obtain the data which would then be sent to television 200 for display via line 210 or line 250. Therefore, the technology that enables the television schedule information to be provided from a database to a television for display is not specific to any given data system. In summary, this technology can be resident in the user's set-top box 220, television 200, VCR 230, personal computer or the like.

The television schedule information provided from a database can be used to provide information which is independent of the viewer's program choice.) For example, from a television schedule guide, the user can utilize remote control 210 to press a Services button. This Services button can be located on remote control 210 or within the television schedule guide display. When the Services button is pressed, the user is given choices such as News, Weather, Sports, Scores, Financial Data, Local Traffic, etc. Using remote control 210, the user can then select the area or title of interest, and the associated information from the database is provided. If accessory 202 is used, a modem accesses the on-line service which provides the information from the database. Once this connection is made, the user has two-way communication with the on-line service provider. The user can then go deeper into the given selections or, if requested and keyboard 262 is available, can access the Internet and enter chat rooms or other interactive services. In the preferred embodiment, keyboard 262 is either an IR keyboard or connected to port 260 on accessory 202.

In yet another embodiment, a television program title and/or a program's content is contextually linked to an on-line service or to an available database. In this arrangement, a user, in conjunction with the data made available through an electronic program guide (or navigational system), can link, search, select, and/or initiate a subscription to more information relating to specific areas of interest or concerns associated with a program or a program's title. In the preferred embodiment, a user of an electronic program guide (e.g., as described above) can conduct a search for information about a particular program/television show or for information relating to the show, the actors, the actresses, the show's theme, other broadcast times or sources, and other related information through selection via a user interface. This linking of program title and/or program content to additional related information could be operable whenever a program title is accessible in a electronic program guide. Additionally, this linking could be available whenever a user requests it via the currently tuned program.

For example, a user previewing the program such as a movie (e.g., "Casablanca") can receive information regarding (1) the actors and actresses in that movie, (2) other movies released during the same time period, (3) associated available products, (4) related travel packages, and (5) advertisements and promotions available through primary, secondary or third party vendors, other broadcast times or sources. Utilizing a user interface such as remote control 210 or keyboard 262, the user can indicate to the electronic program guide what information they would like to view on television 200. The electronic program guide then lists a selection of choices for the user. In the preferred embodiment, the choices are associated with the context of the selected program and can be changed via the electronic program guide supplier. In the "Casablanca" example, the choices might be (1) Other Humphrey Bogart Movies, (2) Other Lauren Bacall Movies, (3) Other Movies Released in the Same Era, or (4) Associated Products, other broadcast times or sources. The user selects from the presented choices, and the electronic program guide contacts and communicates with the database of available information for more detailed information relating to the user's choice. Once contact and communication is established between the user and the database of available television information, the electronic program guide acts as an agent to assure that the information flow and appropriate data is exchanged. At this point, the user can delve deeper into the available information by selecting from a series of further choices or related topics. For example, if the user chooses (1) Other Humphrey Bogart Movies option, the electronic program guide contacts and communicates with the selected database of available information. The database of available information is then used to collect the requested data of other Humphrey Bogart movies. The selected choice is transmitted and used by the electronic program guide as its contextual reference for the search. A list with the search results is then displayed on television 200.

Once the user sees the list of broadcast times or sources for "Casablanca," or other Humphrey Bogart movies, the user can select any of the available titles for recording or watching, or digital storage when digital program directories, libraries, or archival sources are available. In the preferred embodiment, each time the available database is contacted and searched, previously selected movies can be identified. In addition, a user can select certain types of programs to be recorded, watched, or retrieved for digital storage before any particular program is available to the electronic program guide. Moreover, each time a connection is made to an on-line service, the software can search the database and set the selected types of programs to be recorded and/or retrieved for digital storage. These features enable a consumer to never miss a favorite program.

The system and method of the present invention may be configured to automatically or manually customize the television schedule guide to an individual viewer or a group of viewers, e.g., a family. In this embodiment, the remote control device may be used to select certain programs, and a memory stores the television programs that have been selected by the viewer. The programs can be selected for a variety of reasons, such as a designation of the program as a favorite, placing a reminder to watch the program or, when the television schedule system includes a recording device, placing an automatic reminder to the program guide to record the program or, when the television schedule system includes a means of digital storage, automatically downloading or providing an easy confirmation process for downloading the program. The user may also customize specific preferences based on a program title. Through a series of repetitive operations, the electronic program guide can select programs, titles or services that the user would likely be interested in. This can be accomplished through a user interface wherein the user answers preference or choice questions, or through heuristic learning accomplished through the electronic program guide. The electronic program guide would include software for performing this customization.

In an exemplary embodiment, the system includes a database containing each program within the television schedule and/or listing information. The database may be included within a computer integrally combined with the television (e.g., PCTV), a computer that is coupled to the television through suitable lines, or the database may be accessed from a remote computer, e.g., via the internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). The computer will include a processor and suitable software for automatically searching the database for other programs having the same criteria. The processor will automatically place the programs that include the designated criteria into the selection window and provide visual indication of each program in the matrix of cells in the program guide. In this way, the program guide will automatically customize itself to the individual viewer to facilitate use of the television schedule. A more detailed description of this method can be found in commonly assigned co-pending provisional application Ser. No. 60/015,648, filed on Apr. 19, 1996 (Attorney Docket No. 14774-005500), the complete disclosure of which has previously been incorporated by reference.

In another embodiment of the invention, the system will automatically record television programs that are listed as a user's "favorite" or in some other category (i.e., contextual recording). In this embodiment, a user identifies to the system (or the system automatically identifies) favorite subject matters, actors, actresses, etc, as described in detail above. For example, the user may input into the system that he/she would like to add Jerry Seinfeld to the "favorites" list. Thereafter, the system tags any program it finds where Jerry Seinfeld is involved (i.e., he is a guest on the Tonight Show). In addition to tagging the show according to this embodiment of the invention, the system will automatically program the VCR or similar recording device to record any or all of the shows with that tag. The user may then view the contextually recorded programs at any time he or she desires. Thus, the system will constantly search for any show that includes Jerry Seinfeld and record that show, episode, or only the portion of the show that involves Jerry Seinfeld. The user will then have a list of all the shows or some of the shows that feature Jerry Seinfeld, and can view these shows at his or her leisure.

Figure 12:
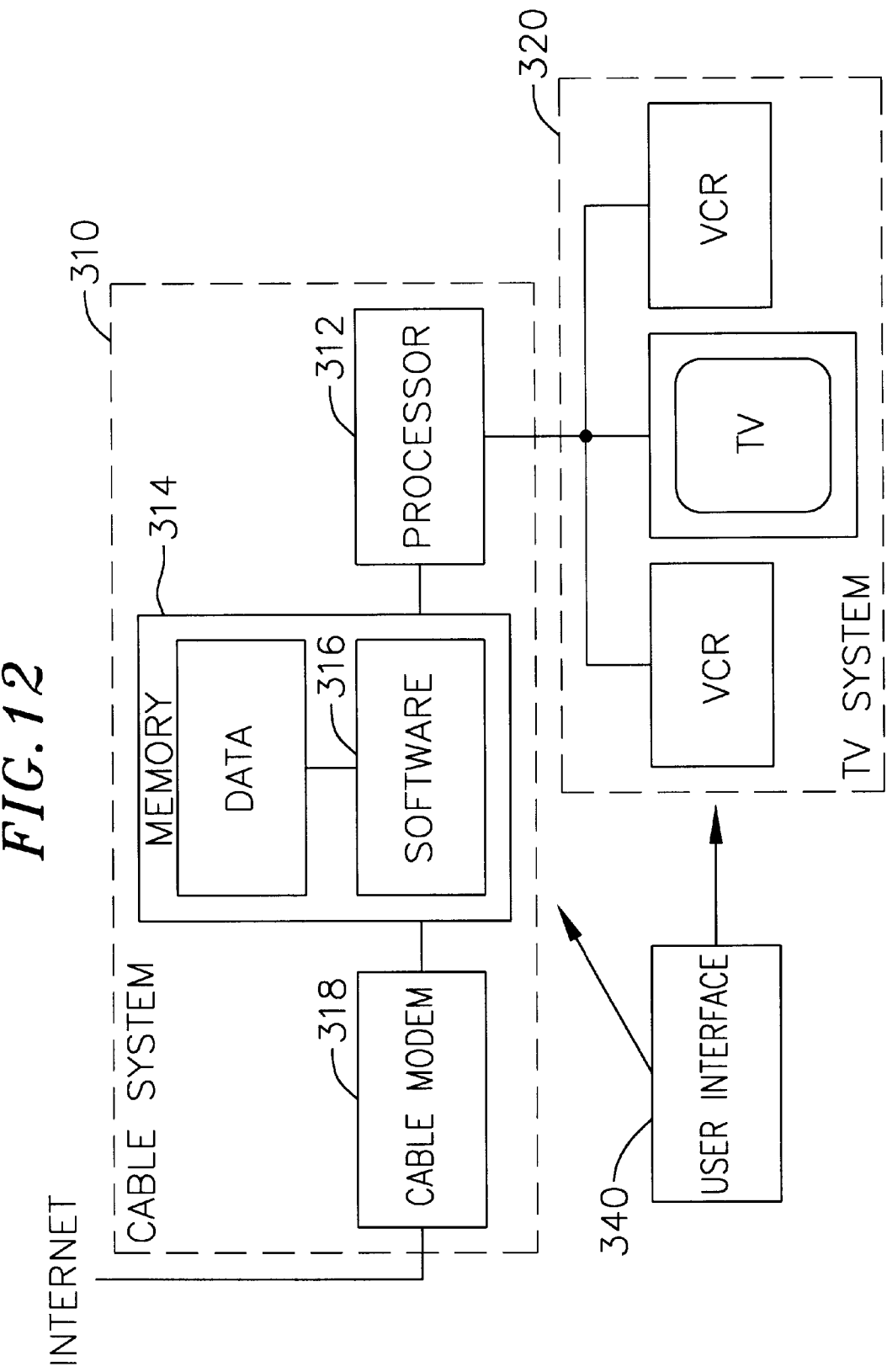
FIG. 12 illustrates an interactive television schedule system according to the invention incorporating a cable system coupled to a television system.
Figure 13:
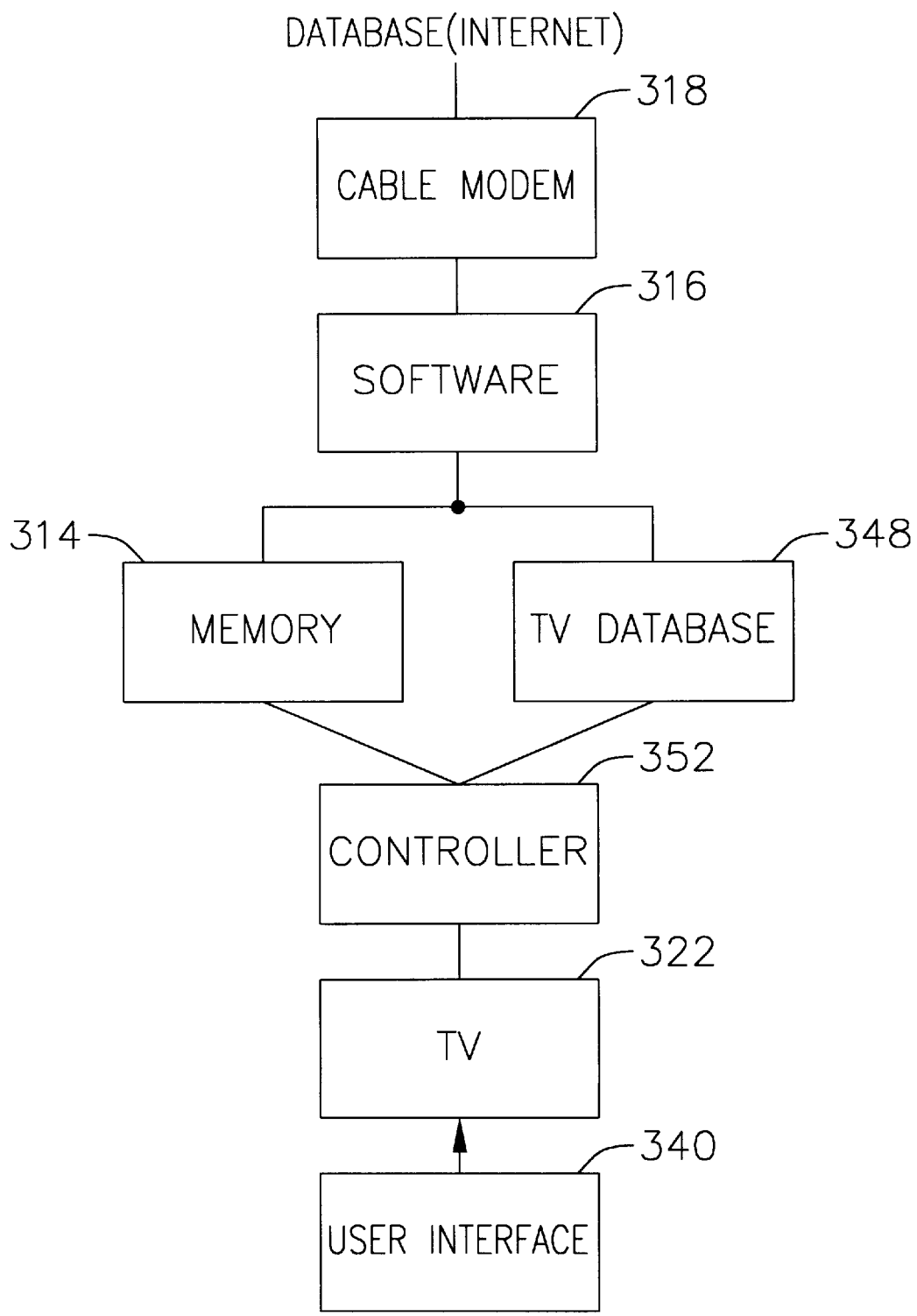
FIG. 13 illustrates a preferred arrangement for providing television schedule information from the cable system of FIG. 12 to a television for display to the viewer.

FIGS. 12 and 13 illustrate an interactive television schedule system 300 according to the present invention which can access television schedule information from the internet, and provide user access to the internet. Access to the internet may be provided in this embodiment without tying up any phone lines, and without the need for a personal computer (e.g., an "NC" or Network Computer). As shown in FIG. 12, interactive television schedule system 200 includes a cable system 310 coupled to a television system 320. Cable system 310 generally includes a processor 312, and a memory 314. Television system 320 includes a television 322 and a user interface device 340. Similar to the above embodiment, television system 320 may include VCRs 324 and 326 coupled to television 322. In a specific embodiment, memory 314 of cable system 310 stores software 316 for receiving, organizing, and displaying any received data into a television schedule guide. In addition to software 316, data for the basic schedule information and other related data (e.g., data relating to a particular show) are also stored in memory 314 as they are needed for the generation and maintenance of the television schedule guide. This data is received, in the preferred embodiment, via a cable modem 318, which may access the data from the internet. The software 316 then utilizes the data received from cable modem 318 to generate a television schedule guide. The user can access this generated television schedule guide when desired.

In the embodiment of the present invention shown in FIG. 12, two programs provided at the same time can be automatically recorded because two VCRs 324 and 326 are present. The user need only select two programs for recording and the present invention will automatically cause the programs to be recorded when they are aired in an unattended fashion. The user can also directly select which device or devices will be recording or tuning for each selected program. For additional information, see commonly assigned U.S. Pat. No. 5,151,789 to Young, the complete disclosure of which has previously been incorporated by reference.

FIG. 13 illustrates an arrangement for providing television schedule information from cable system 310 to a television for display. In one embodiment, cable modem 318 provides access to a database, which may be on-line; the database contains the television schedule information, and the information is transmitted to the television. Software 316 stored in memory 314 is used to search for and provide the information, along with providing several other features described below. The available data, displayed on the television, may be stored in memory 314 within cable system 310, or within a database 348 within television 322. A controller 352 is used to obtain the data from memory 314 or from database 348 to display it on television 322. From the television schedule guide, the user can further utilize user interface 340 to press a "Services" button. This Services button can be located on the user interface or within the television schedule guide display. When the Services button is pressed, the user is given choices such as News, Weather, Sports, Scores, Financial Data, Local Traffic, Network, etc. Using the user interface, the user can then select the area or title of interest, and the associated information from the database is provided.

The user can further access the internet by choosing Network from the guide using the user interface. Cable modem 318 accesses the internet, and once connection is made, the user has two-way communication with on-line service providers. The user can then access the different on-line services. For example, a user viewing a sporting event may press the Services button, and a different menu will appear with the following choices: (1) Sports Scores, (2) Current Game Statistics, (3) Current Player Statistics, and (4) Associated Products. If the user selects (4) Associated Products, the software, will notify the cable modem and instruct the cable modem to establish connection with an on-line service provider. The on-line service provider then lists a series of selections associated with the game (e.g., 49er's hats, Giant's Baseball Bats from Louisville Slugger, Nike Spiked Football shoes for Pop Warner, etc.), and the user can interact with the service provider accordingly.

Figure 14:
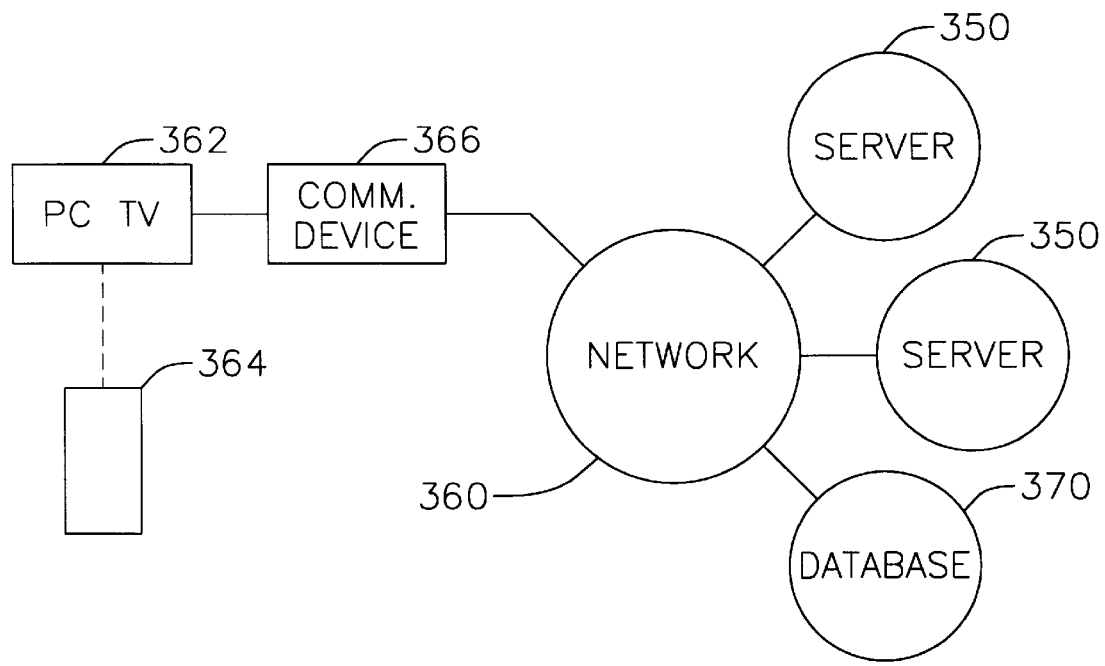
FIG. 14 illustrates a system and method for accessing television schedule information at a network file server on the internet.

FIG. 14 illustrates a system and method for accessing television schedule information from one or more servers 350 on a computer network 360, such as the Internet or the World Wide Web. The television information guide may be accessed and viewed through a computer system, a television system, a PCTV, or a simple display coupled to a communication link, such as a telephone line or the like. In the representative embodiment, a PCTV 362 is illustrated with a user input device 364, such as a remote control, keyboard, mouse or the like, and a communication device 366 for accessing computer network 360. As discussed above, communication device 366 may include a wide variety of data lines, such as telephone lines, cable modems, etc.

In one embodiment, the computer network 360 includes a plurality of servers 350 and a database 370. The database 370 includes television schedule information, which may be retrieved and viewed on PCTV 362. Servers 350 represent file servers having files, databases or the like. In a representative embodiment, the computer network is the World Wide Web and each server 350 is set up as a network file server addressable by a unique address. For example, the servers 350 may be configured to follow a common network protocol such as the Transmission Control Protocol (TCP), and the Internet Protocol (IP) (commonly referred to collectively as TCP/IP), and may be assigned a unique IP address or internet domain name. For example, the servers may be assigned the domain name "invoice.com". The servers 350 may also have some form of server software installed to permit the system to function as an internet graphics server. For example, the servers 350 may be configured with HyperText Transport Protocol (HTTP) server software to permit the system to function as an internet "world wide web" (WWW) server. In this embodiment, PCTV 362 may access servers 350 via the WWW using WWW compatible software by indicating the system's uniform resource locator address: "HTTP://www.invoice.com".

In another embodiment, the television schedule guide (not shown) is stored as one or more files (e.g., a websites or internet broadcast transmitters) on one of the servers 350, which can be accessed by any viewer having access to the World Wide Web. The television schedule guide or website may be configured for viewing and interacting with television information directly on-line, or it may be configured for downloading the information into a computer hard drive or other suitable processor. The guide will provide listings information for all channels in the viewer's local cable line-up. Preferably, the guide will be capable of creating personalized TV listings with search and sort features (discussed below) that allow the viewer to call up favorite programming choices based on categories, such as channel, day, actor, movie genre or other desired categories. The guide may also include other information about programs, such as ratings, stars, type of movie (e.g., suspense, comedy, drama, western, musical, children, biography, horror, etc.). This information may be provided on the actual website and/or internet broadcast transmitter, or the website and/or internet broadcast transmitter may provide means for linking the viewer with other websites and/or internet broadcast transmitter to provide more information on certain topics and categories.

Since the television guide website and/or internet broadcast transmitter may be accessed from virtually any location in the world, it will preferably include a mechanism for selecting a region from which the television guide is applicable. For example, the television guide may include television schedule and/or listing information from a variety of countries throughout the world, or the information guide may be limited to the United States. To obtain television schedule information for a particular region, the user can select an appropriate state, city, or other region, such as a region covered by a particular cable company. Alternatively, the television schedule guide may provide information for certain networks and stations (instead of particular channels or stations), such as CBS, FOX, HBO and the like, that are global to all regions of the country. With this configuration, the television guide may include a time zone selection so that the guide can automatically be configured for the particular time zone in which the user will watch television.

In one embodiment of the present invention, the system will include a search engine that allows the viewer to search for particular types of programs that will be broadcast within a certain period of time. The search engine may include categories such as title, description, category, dates, day parts, channels, actor/actresses, directors, etc. In addition, the viewer may obtain more information on the programs within each category. For example, the guide could provide information on movies in many categories, including theatrical, made-for-TV movies, Spanish, French, etc. The guide can tell you what Clint Eastwood movies are on this week, how many StarTrek episodes this weekend, or whether your favorite basketball team is on TV this Saturday. The on-line viewer may customize their own listings by title, year, actors, director, run themes, critical star rating, MPAA, warning lines, video laser disc, full descriptions, genre, and holidays with themes. In another example, the guide could provide information on shows and series, including network shows, first run, British, PBS, cult favorites, syndicated shows, talk shows, local productions and obscure programs. The user may sort by, for example, title, episode run times, genre, original air date, etc.

In another aspect of the invention, the web site television guide will include a highlight section that highlights particular programs that will be broadcast during the day, week or month. For example, the guide may have a web page that picks a "hot pick" for each day of the week, and provides a picture or video together with descriptive information, such as an editorial comment, on the video hot pick. In addition, the user may be able to move to other areas where more information can be provided on particular moves, such as articles, interviews with actors/actresses, editor's choice reviews, commentaries, etc.

In another aspect of the invention, the system will include a variety of files on the same or different network servers that allow the user to interact with other users, program sponsors, advertisers, etc. For example, the system may have a web site that allows viewers to chat about certain programs (each program itself may have its own web site). In addition, the system may include a "virtual agent" that searches existing websites and/or internet broadcast transmitter on the internet and points to websites and/or internet broadcast transmitters that may interest the viewer. The virtual agent will learn from previous user choices to customize the television guide for each particular viewer.

Figure 15:
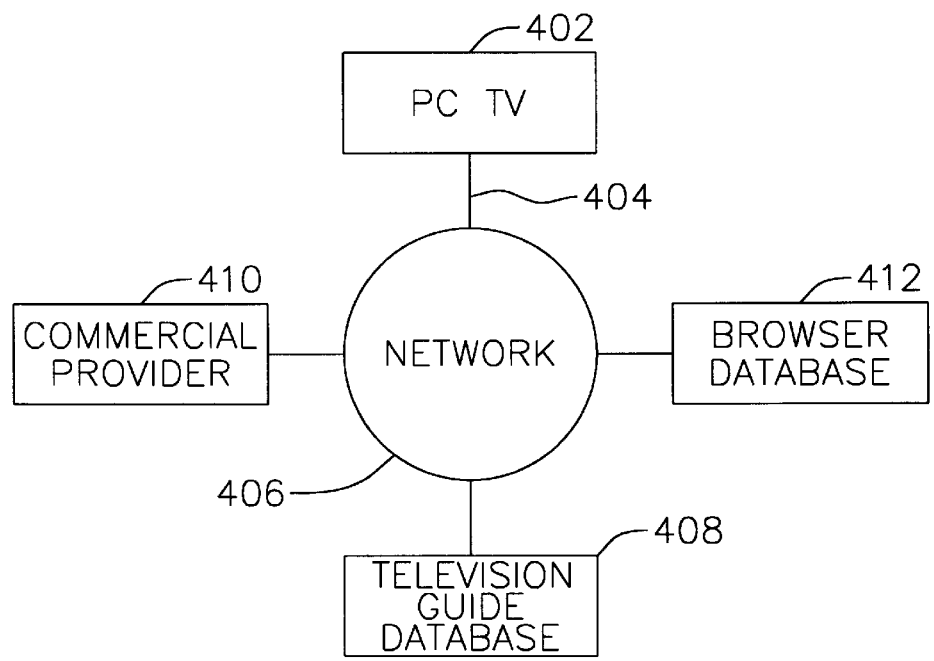
FIG. 15 schematically illustrates a system and method for viewer interaction with commercial advertisers and program sponsors within the television schedule information system of the present invention.

FIG. 15 schematically illustrates a system and method according to the present invention for linking television viewers with broadcasters and advertisers during the broadcast of a commercial or program. As shown, system 400 includes a viewer interface 402, such as a television, computer, PCTV or a television coupled to a computer system. For convenience, the system will be described as utilizing a PCTV 402. A data line 404, such as a cable modem, telephone line or other communication link, couples the PCTV 402 with a remote database, network server or on-line-service, such as the Internet 406. A television guide database 408 is also coupled to the Internet 406 for providing the television schedule information to PCTV 402. This information may be downloaded to PCTV 402, or it may be configured for viewing only while the viewer is actually connected to database 408. Alternatively, the television guide may be drawn locally from a processor within PCTV. As shown, a commercial provider 410 (e.g., Budweiser) and/or a television station broadcaster 412 (e.g., ABC) also have databases directly coupled to PCTV 402 or through Internet 406.

PCTV 402 may include a memory and a processor with appropriate software (not shown) for searching and retrieving information from databases on the Internet 406 based on user selections. Alternatively, this function may be provided through Internet 406, television guide database 408 or through the commercial provider 410 or broadcaster 412. In this embodiment, PCTV may access, download, and/or automatically upgrade an application or applet (e.g., a Java™ applet) having the appropriate software to run the television schedule guide on a display, e.g., a computer monitor, television display or other user interface.

In one example, the viewer is watching a sports event, such as a football game. One or more icons or other visual indicators are located on the television screen in a convenient location, such as the top, right corner. One of these icons may be an icon that represents the television schedule guide. The viewer can move a cursor or other visual indicator to the television guide icon and click thereon to open up the television guide as discussed in detail below. Another icon may be provided, for example, by a commercial sponsor. Moving into and activating this icon allows the viewer to link with a database provided by the commercial sponsor, or to a portion of the television schedule guide database that allows the viewer to purchase an advertised product, make a monetary contribution, respond to a survey, answer a question, or participating in contests with other viewers, for example.

By way of example, Budweiser may provide a database 410 that allows the viewer to purchase a coupon for a free six-pack or other items, such as Budweiser T-shirts, hats, etc. The viewer may purchase the coupon, hats, or T-shirts directly through the commercial sponsor, or through a delivery system provided by the television schedule guide (discussed in detail below). This type of advertising allows the advertiser to directly target a particular program, and it allows the viewer to directly purchase the products during the advertisement. In addition, viewers will not forget the advertisement or simply lose motivation to spend money or request information after the commercial or program is over.

In another example, the television network that is broadcasting the program may provide an icon that allows the viewer to access a database 412 providing more information about the football game, previews of upcoming programs related to the program, such as another football game later on in the week, or other products and services related to the football game.

FIGS. 16–21 illustrate a sample television schedule system 500 with a grid guide, and methods for utilizing the television schedule system with the contextual linking system and method of the present invention. Of course, it should be recognized that the invention is not limited to the specific television schedule system shown in FIGS. 16–21. For example, other suitable television schedule systems are described in the user manuals "Using Starsight 2", "Starsight Interactive Television Program Guide, Phase III", and "Starsight Interactive Television Program Guide, Phase IV", which are attached to U.S. patent application Ser. No. unassigned, filed Apr. 11, 1997 (Attorney Docket No. 14774-004410), as Appendices A, B, and C, and of which are incorporated herein by reference, or commonly assigned U.S. Pat. Nos. 5,353,121, 5,479,266, the complete disclosures of which are also incorporated herein by reference. The television schedule system 500 shown in FIGS. 16–21, however, is particularly advantageous with the contextual linking system of the present invention as it enables the viewer to quickly and efficiently browse through the television schedule, and to interact with a wide range of services that are related to the programs in the television schedule.

Figure 16A:
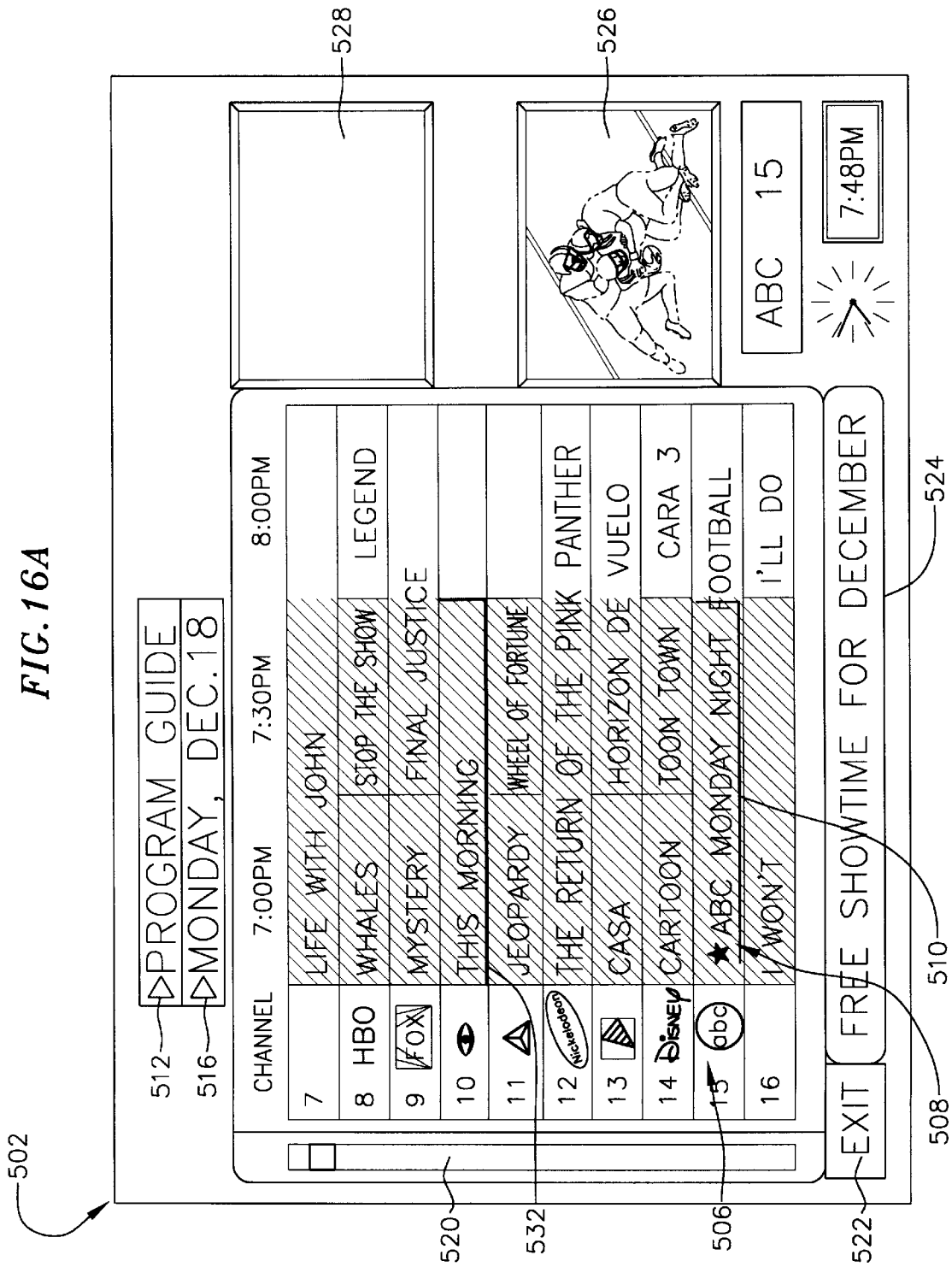

FIGS. 16A and 16B illustrate a program guide 502 and a channel guide 504, respectively, for the television schedule system of the present invention. The program guide 502, which is the primary mode in the television schedule system, includes a number of screen information areas or windows in a particular screen where the viewer operates a input device, such as a remote control, to move around vertically and horizontally and to interact with that screen area's function. Within each screen area are one or more items, typically arranged in a matrix or grid so that the viewer can scroll through the grid to select or activate items within the grid. Activation of an item will invoke a Submenu, a Dialog, a Panel, invoke an action or the like.

As shown in FIG. 16A, program guide 502 preferably includes a schedule information area 506 having a program matrix 508 of cells or items that depict the shows that are being presented on each channel at each time during the day. Program guide 502 conveniently lists the channels in a vertical column to the left of the program matrix 508 and the times in a horizontal row above matrix 508. As shown, the viewer may vertically scroll through a particular time or horizontally scroll through a channel with the remote control device. As the viewer scrolls through matrix 508, a cursor 510 will indicate the user's location within the matrix 508. Alternatively, the item may be automatically highlighted with a brighter color to indicate the viewer's location. Preferably, program matrix 508 will also be shaded to indicate the portion of each show that has already been presented. For example, as shown in FIG. 16A, the shading extends to 7:48 (the current time as indicated at the bottom right of program guide 502) to indicate which portion of the show the viewer has already missed.

As shown in FIG. 16A, program guide 502 includes a number of other information areas. For example, program guide 502 includes a mode menu area 512 that indicates the currently active mode (i.e., program guide 502) and allows the viewer to pull down a mode menu 514 (see FIG. 17A). Program guide 502 also includes a date area 516 that indicates the date reflected in program matrix 506 and allows the viewer to pull down a date submenu 518 to change the date. In other submodes, the submode menu will display options for ordering or displaying lists that are appropriately related to the submode. A proportional scroll bar 520 located to the left of program matrix 506 is visually proportional to the total information in program matrix 506 to provide visual feedback as the user vertically scrolls through matrix 506. In addition, scroll bar 520 may be used for large-scale movement through hundreds of channels/ sources by navigating to bar 520 and then vertically moving bar 520. An exit area 522 allows the viewer to immediately exit back to the television by navigating to exit area 522 and clicking on the remote control device. A program area 526 depicts the currently tuned program and a preview window area 528 can be used for all types of promotional, descriptional, or contextual video or graphics, such as a short preview of the show that is currently being highlighted in show matrix 506. Preview window area 528 may also be interactional similar to the other areas of guide 502.

The program guide may also include a variety of additional areas to facilitate use of the television schedule system, present information to the viewer or advertise programs or other products. For example, a scrolling commercial message 524 may be located underneath program matrix 506 that advertises programs or products from program sponsors, etc. The viewer may navigate to message 524 to receive more information or to purchase the product or program.

This function of ordering items is not limited to videos. For example, the program may access other contextual linked services such as a commercial store, etc., to allow the purchaser to buy a wide variety of different services or goods directly or indirectly linked to a particular program. For example, an Info Menu for Monday Night Football may allow the viewer to scroll through submenus that allow the viewer to purchase Washington Redskins' caps, Minnesota Vikings' caps or any NFL cap. The viewer has a choice to follow a program's link back to the commercial area where a larger selection of items and services are available. A product like the cap above may lead the viewer directly to an NFL proshop, whereas a link to a movie on demand may lead back to a commercial film library.

FIG. 16B illustrates the television schedule system of the present invention in the channel guide mode. As shown, channel guide 504 is similar to program guide 502 except that it includes an information screen area 530 that is reversed from the information screen area 506 in the program guide. Thus, the viewer can scroll vertically to move forward and backward in time along one channel and horizontally to move from channel to channel.

Figure 17A:
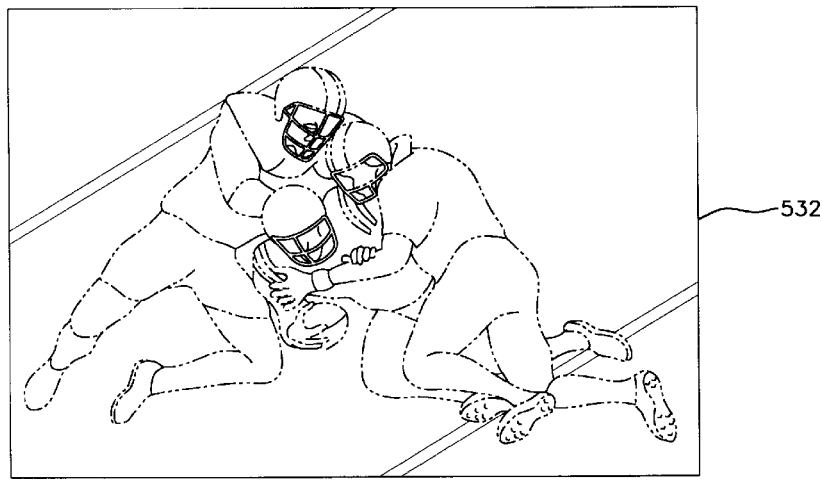
FIGS. 17A–17C are schematic views illustrating a method for selecting a program information menu, moving to the program guide of FIG. 16A and browsing through information menus from other programs.
Figure 17B:
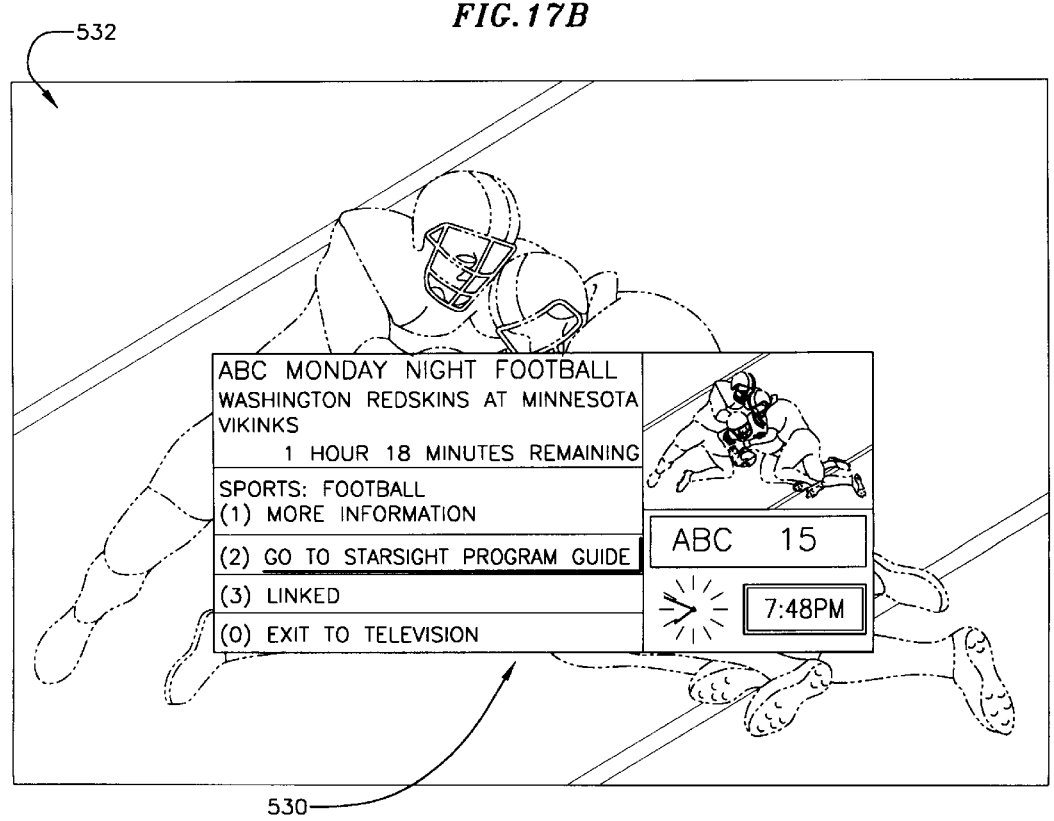
Figure 17C:
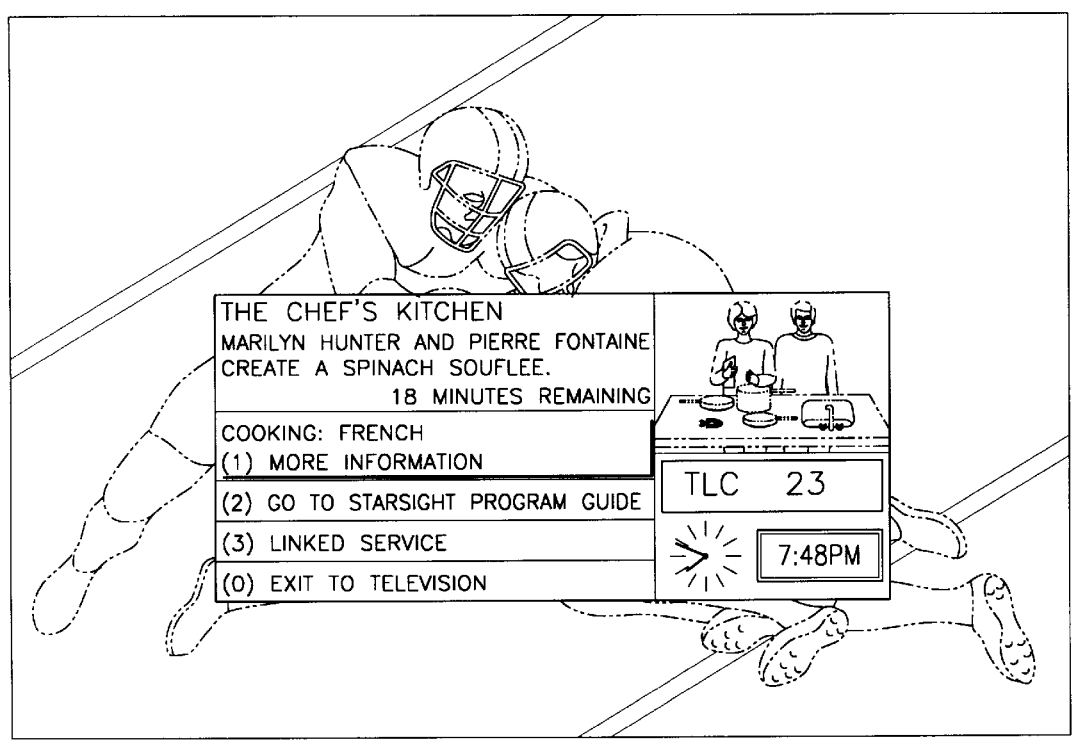

FIGS. 17A–17C illustrate a method of accessing program guide 502 from a currently tuned program and browsing through other currently tuned programs with remote control device 2. As shown in FIG. 17A, the viewer is watching a television show on a display screen 532, such as a Monday Night Football game featuring the Washington Redskins versus the Minnesota Vikings. Clicking on the remote control device automatically causes a Program InfoMenu 530 to pop up on a portion of the television screen 532 (see FIG. 17B). Program InfoMenu 530 may allow the viewer to obtain more information about the currently tuned program, move to program guide 502, move to contextual linked services (discussed below), or exit InfoMenu 530 back to the television show. The viewer may vertically scroll through these options upwards or downwards, and select one of the options. For example, clicking on the "Go to program guide" section immediately transfers the viewer to the program guide, as shown in FIG. 16A. To browse other currently tuned programs, the viewer employs suitable channel controls or other input commands on the remote control device (not shown). As shown in FIG. 17C, the viewer may browse through other information menus while viewing the currently tuned program.

Figure 18A:
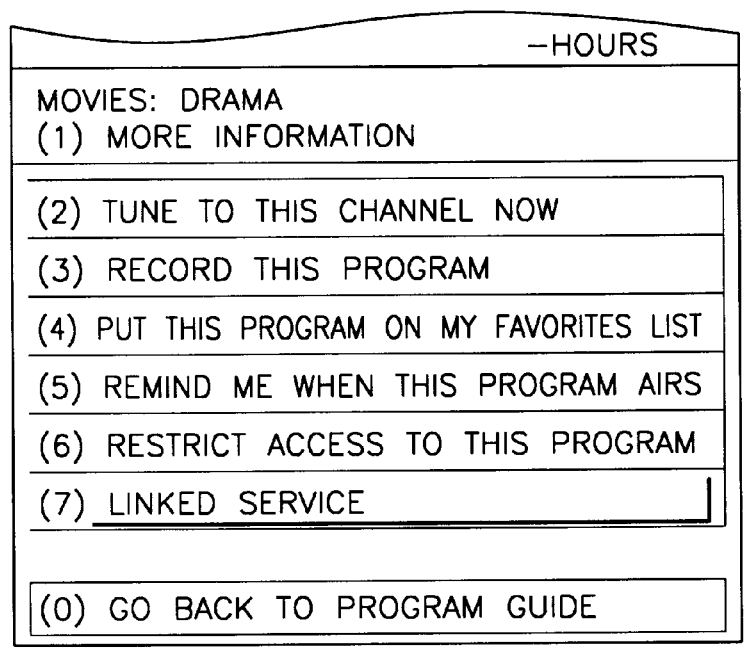
Figure 18B:
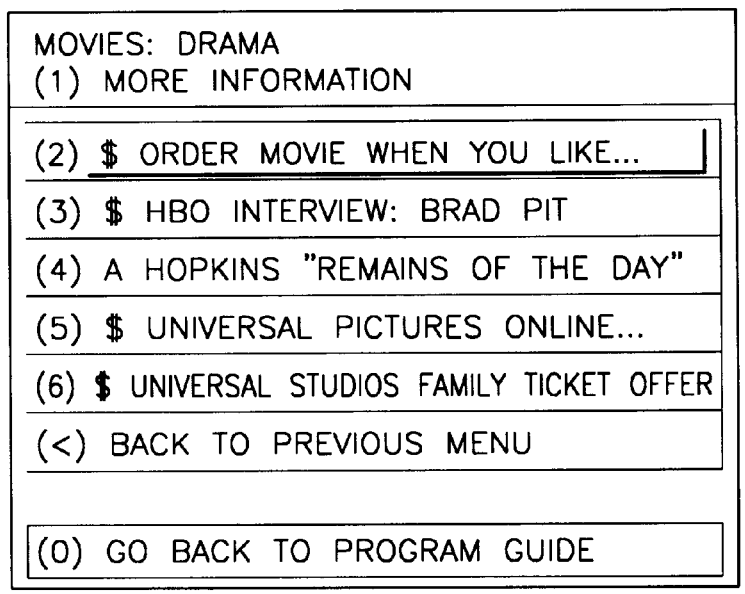
Figure 18E:
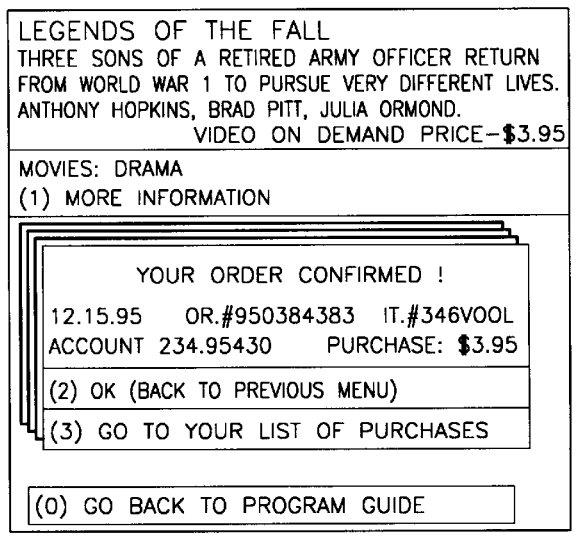

FIGS. 18A–18E illustrate a method of ordering video on demand with the system of the present invention. As shown in 18A, the viewer opens up the program's InfoMenu 530 and scrolls down to the "linked services" item. The viewer is then presented with an easily scrollable menu 562 of items and services associated with this program, as shown in FIG. 18B. Some, denoted with a dollar sign, are purchasable. Free items would be instantly accessible to the viewer. Here, the viewer may be prompted to a simple procedure to specify when the movie is to be delivered. When the viewer selects a particular service or item requiring a financial transaction, a purchasing sequence unfolds. As shown in FIG. 18C, the viewer is prompted to enter the master password/access code via the remote keypad or other means. For example, the viewer could swipe his or her credit card through a slot on the remote control device. If the password/access code is accepted, the viewer is given a final opportunity to review the purchase and/or either confirm or return to the previous item menu (see FIG. 18D). When the viewer confirms his or her purchase and/or order, a receipt 570 is shown (FIG. 18E). The viewer is given the choice of returning to the previous item menu or, as always, at the very bottom item "0", to return to the program guide.

Figure 19A:
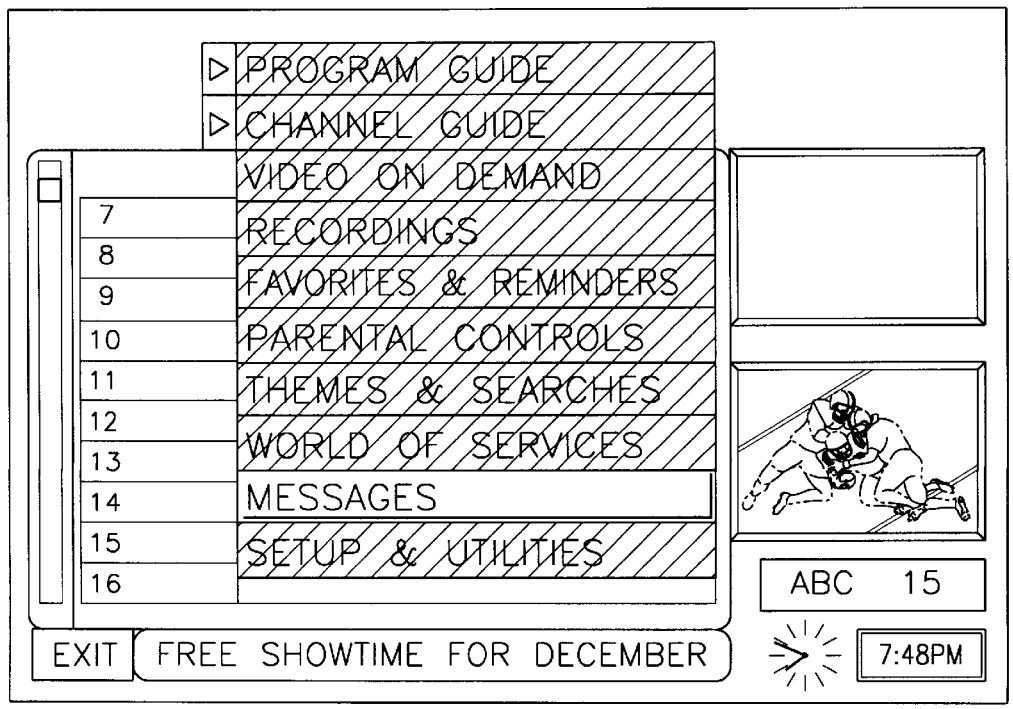
FIGS. 19A–19C illustrate a method for accessing and sending mail messages.
Figure 19B:
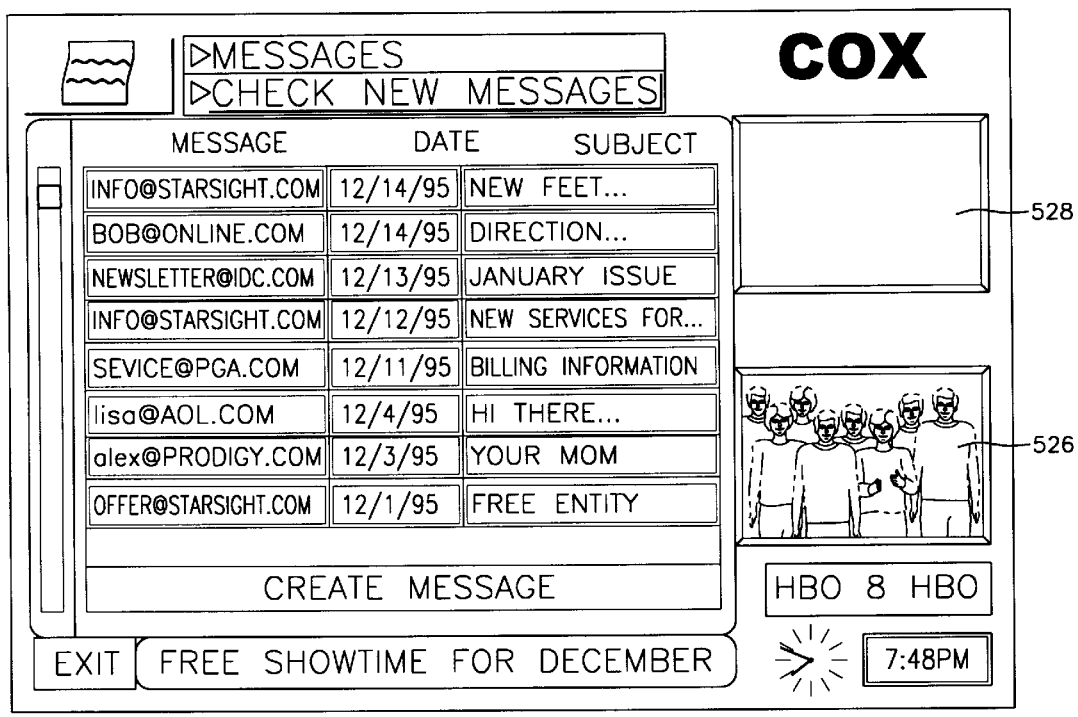
Figure 19C:
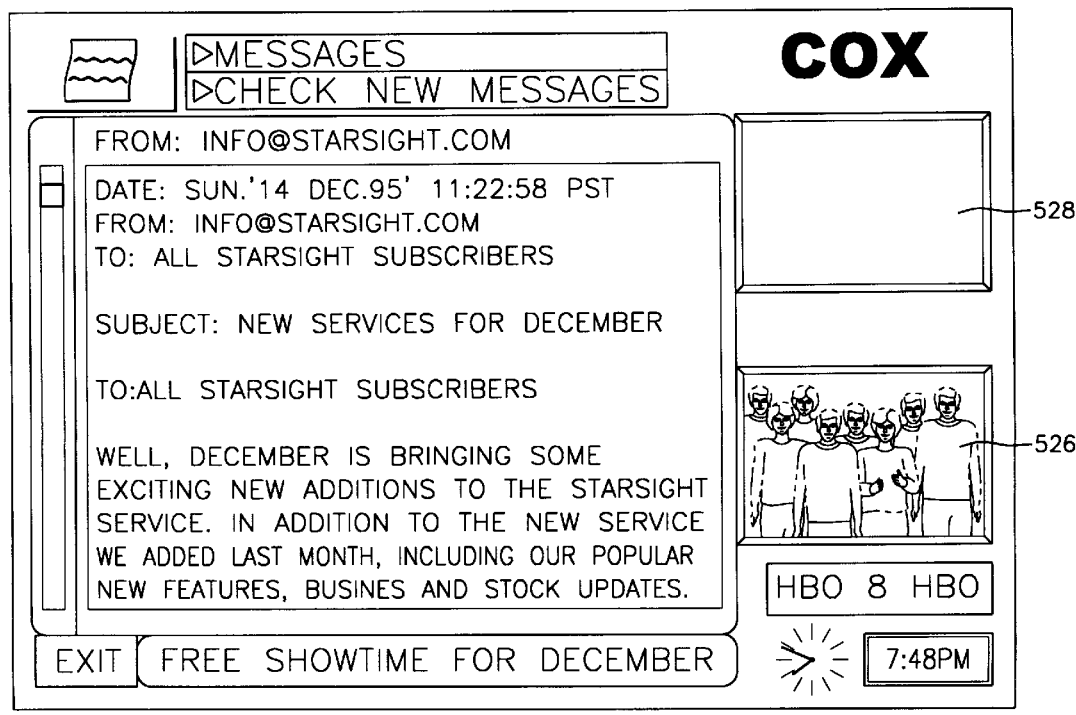

FIGS. 19A–19C illustrate another embodiment of the present invention in which the television viewer may accept incoming e-mail messages or send outgoing messages to other television viewers or users connected to the television schedule system, e.g., users on the Internet. As shown in FIG. 19A, the viewer scrolls down to the Messages window in the Mode menu and activates this window to enter a submode menu. To read incoming messages, the viewer scrolls down to the "Check new messages" cell and activates this cell to display messages that have been received. The Messages mode organizes incoming messages in order of date received and displays them in lists (see FIG. 19B). The viewer may then scroll to a particular message, as shown in FIG. 19C. To send outgoing messages, the viewer scrolls down to the "Create message" cell and activates this cell to open up a blank window. A message may be created by inputting text on the input device, through voice activation via a microphone on the input device.

Figure 20A:
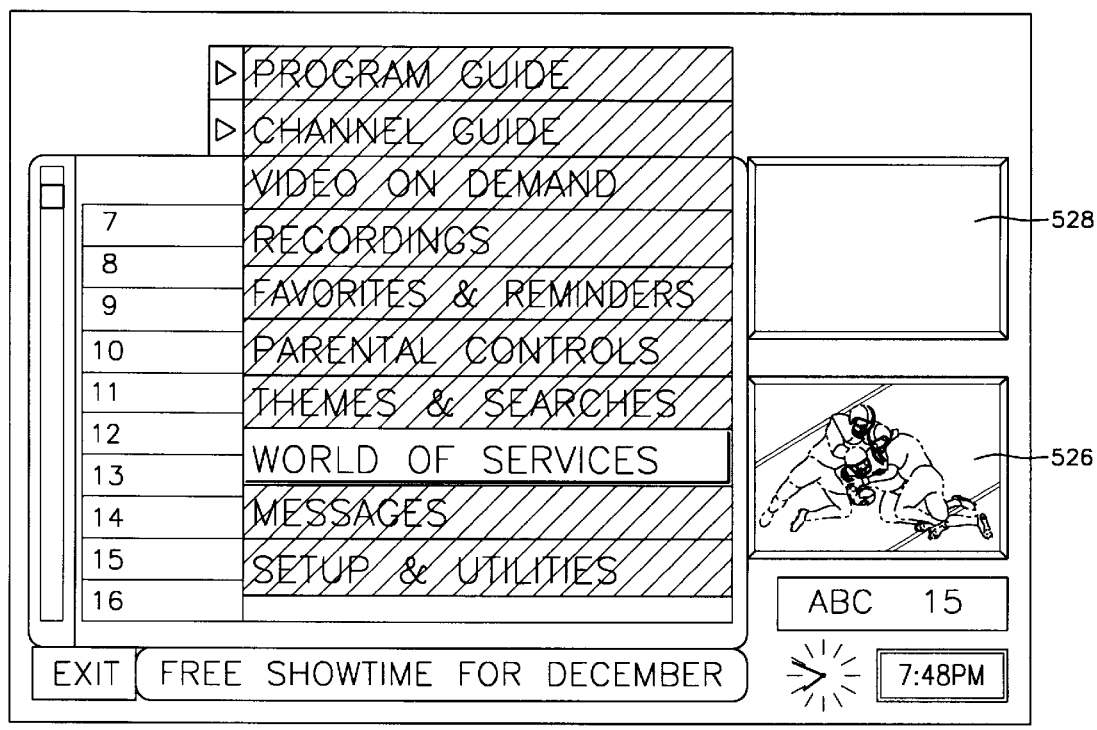
FIGS. 20A–20C illustrate a Services Menu and a method for accessing special services and for purchasing items.
Figure 20B:
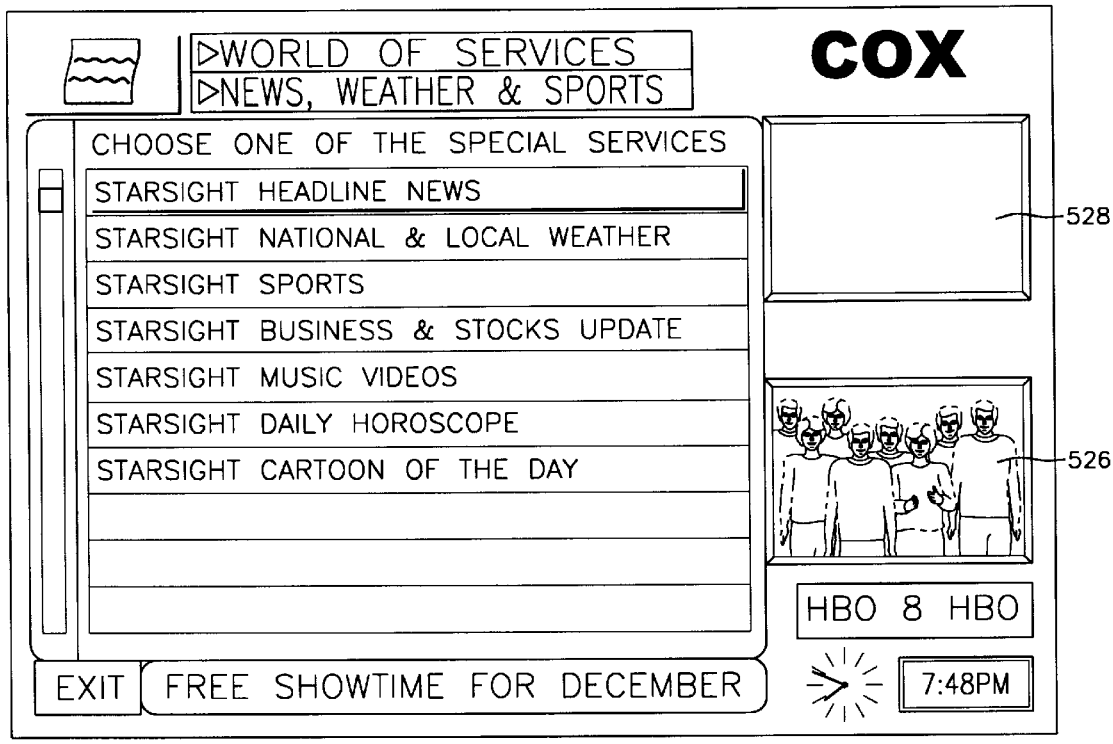
Figure 20C:
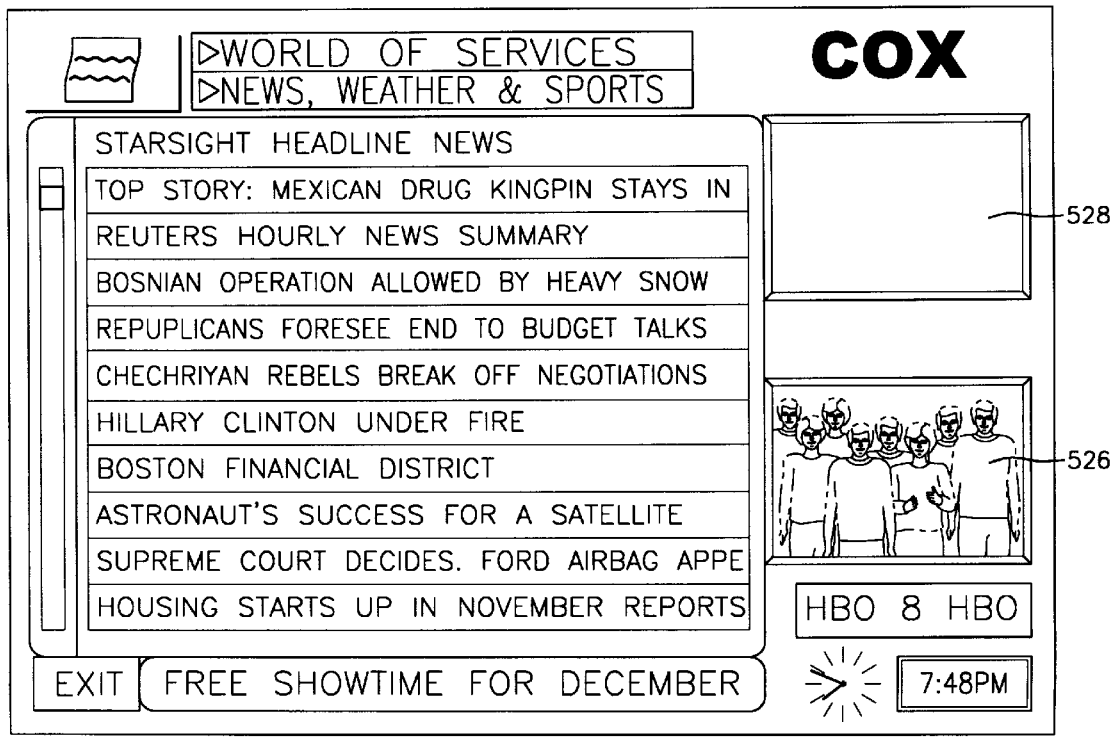

FIGS. 20A–20C illustrate a method of accessing a whole variety of other services to the Internet with the interactive television schedule system of the present invention. As discussed above, databases on the Internet may be accessed through a telephone line, cable modem or other means of communication. As shown in FIG. 20A, the user scrolls down to the world of services mode and clicks on this mode to obtain a submode that includes a variety of different services, such as news, weather and sports, previews and reviews of programs on the television schedule guide, a super mall for purchasing products and services related to the programs in the television schedule guide, or other products and services on the Internet or World Wide Web. As shown in FIG. 16C, the user has selected news, weather and sports, which opens up another menu involving a variety of special services, such as headline news, national and local weather, sports central, business and stock updates, music videos, daily horoscope, cartoon of the day and/or other services related to news, weather and sports. These services may be provided by a special database that is linked to the television system, to an on-line information provider, such as America On Line, Prodigy and the like, or with a search engine that searches network servers or databases on the Internet and World Wide Web. As shown, the user selects headline news which opens up another menu providing the user with a variety of news reports that may be accessed. The news reports may be viewed, printed out, or downloaded to the computer system that is attached to or an intricate part of the television system, (e.g., PCTV).

Figure 21A:
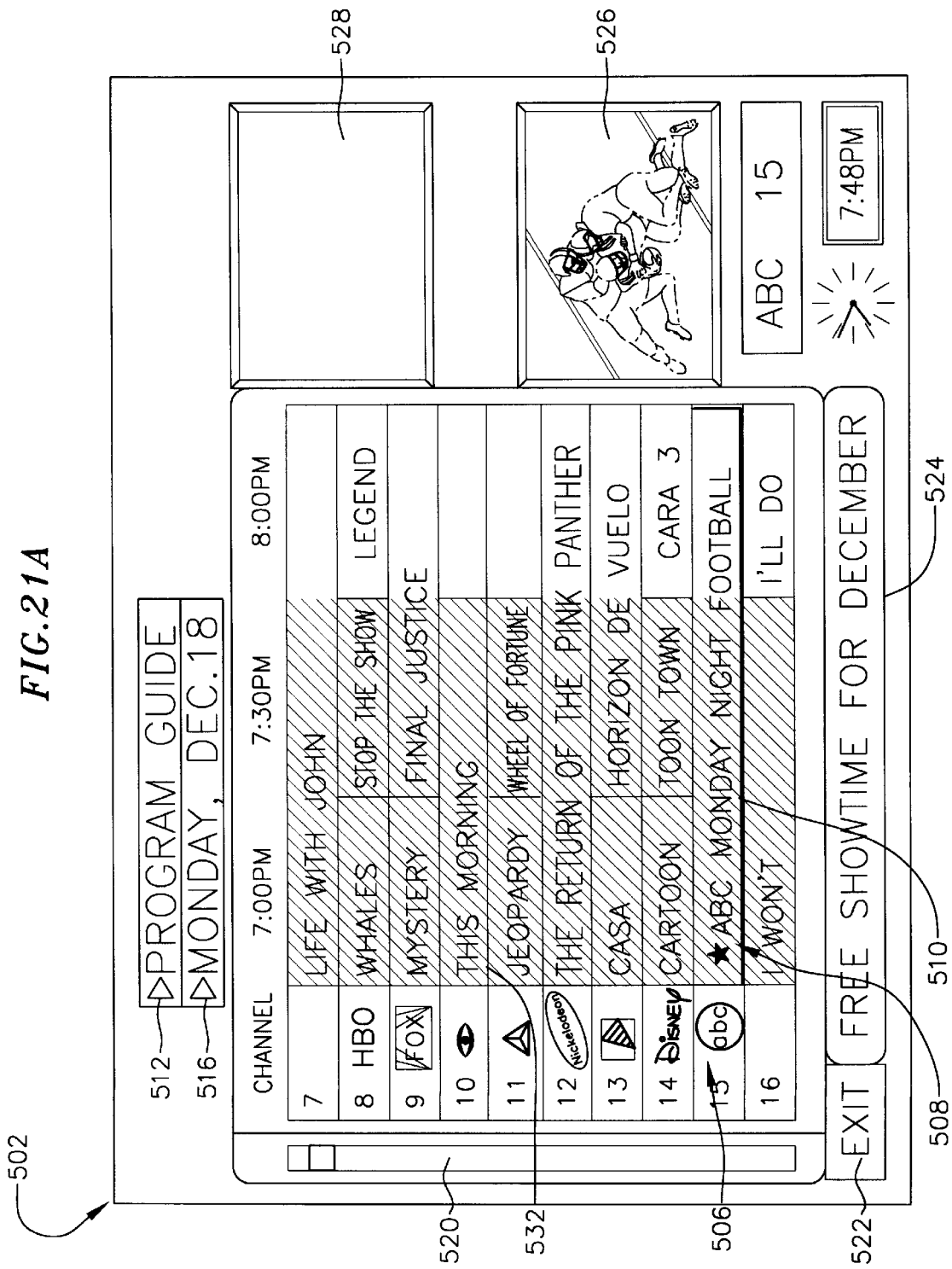
Figure 21B:
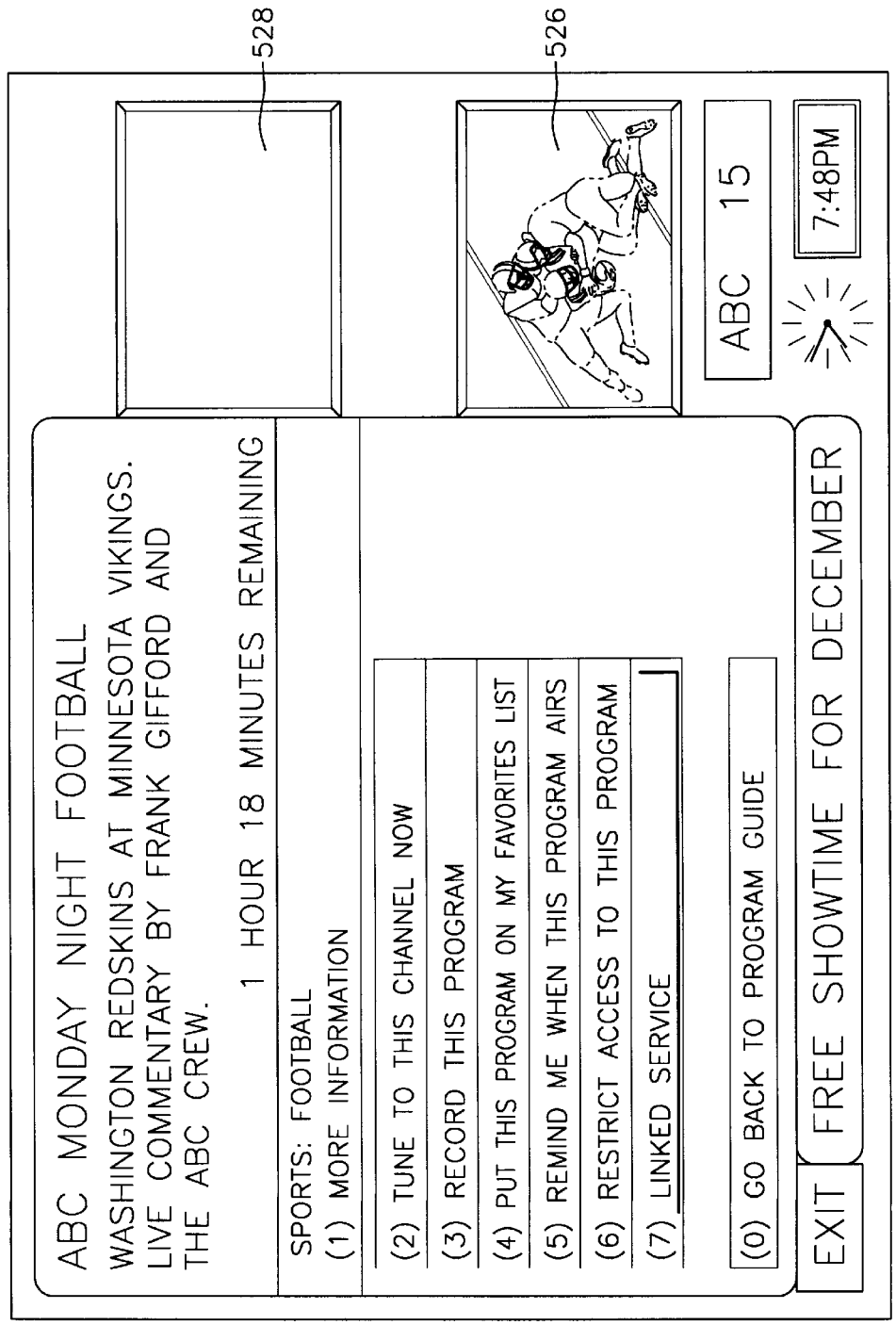
Figure 21C:
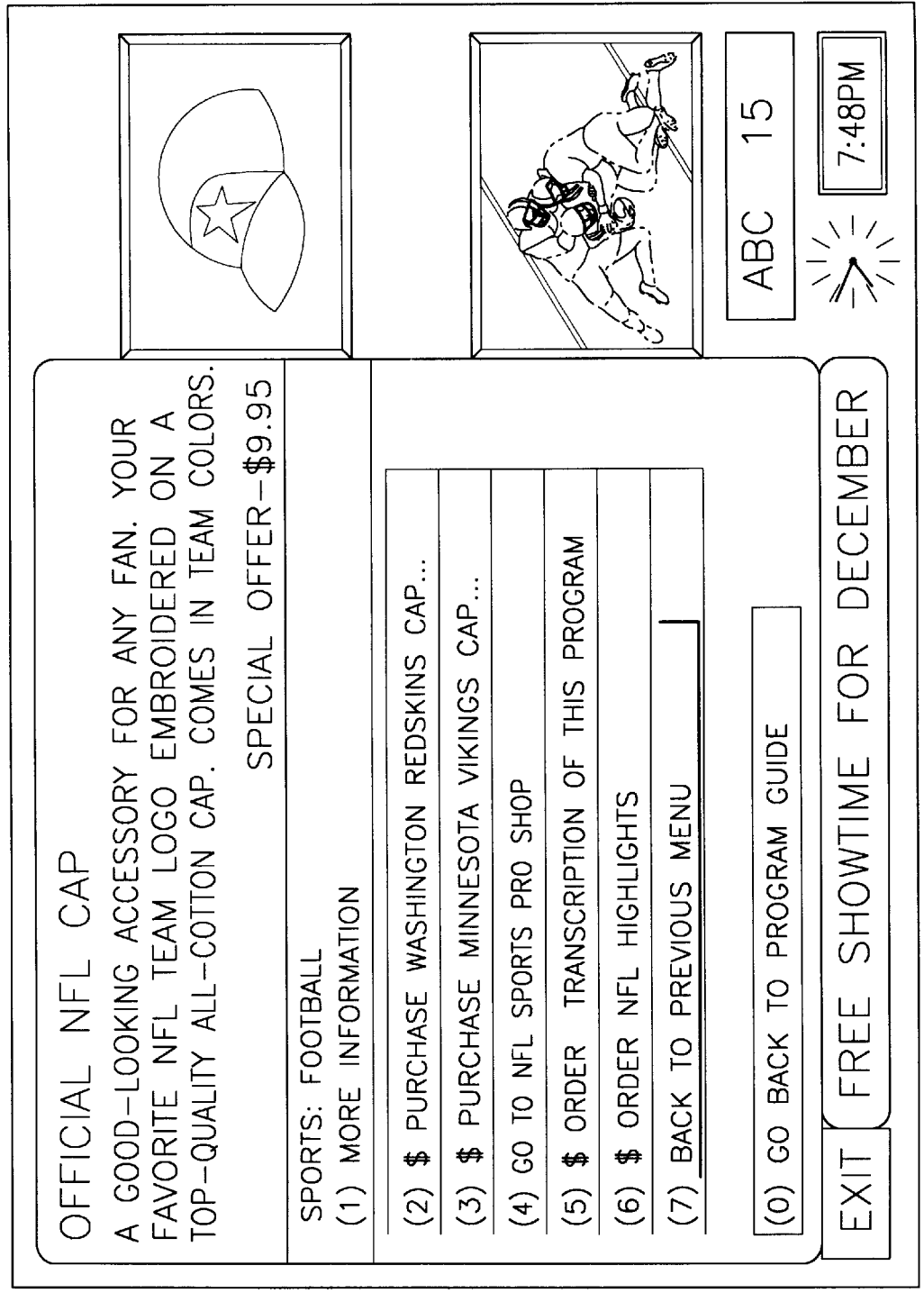

FIGS. 21A–21F illustrate a representative system and method for contextually linking related items and services to a particular program in the program guide 502. As shown in FIG. 21A, the viewer selects a particular program within guide 502, to access that program's info menu. Within the info menu, the viewer then scrolls to linked services and clicks on this window to move into a database that includes items and services contextually related to that particular program. In the example shown, the viewer has been watching a sport event featuring the Washington Redskins v. the Minnesota Vikings. The viewer is transferred to a window that provides a number of options for purchasing items and services related to that game, such as Washington Redskin or Minnesota Vikings paraphernalia, other NFL teams paraphernalia (in an NFL sports pro shop), or highlights of other games between these two or other teams. Alternatively, the viewer may order a tape/transcript of the program that is currently being shown on the guide. FIGS. 21C–21F illustrate a case in which the viewer has selected purchasing a Washington Redskin cap. The viewer inputs a password or other input identification, which is confirmed by the system. Alternatively, the viewer can simply swipe his or her credit card or other identification card through the remote control device or the television system to authorize the purchase of the Redskins' cap. The order is confirmed and the cap is delivered to the viewer's home.

Although the foregoing invention has been described in detail for purposes of clarity, it will be obvious that certain modifications may be practiced within the scope of the appended claims. For example, the viewer can automatically tune to a desired program or can select different programs for automatic recording. For more information on automatic tuning and automatic recording, see U.S. Pat. No. B1 4,706,121 and U.S. patent application Ser. No. 08/423,411; this patent and this patent application are, like the present patent application, assigned to Starsight Telecast, Inc. U.S. Pat. No. B1 4,706,121 and U.S. patent application Ser. No. 08/423,411 are hereby incorporated by reference in their entirety for all purposes.

It should be also noted that the present invention is not limited to a television schedule as shown in the enclosed figures. For example, in another embodiment of the invention, a program listing is provided that lists a series of television programs that are available for viewing. This listing can include, for example, a list of movies that are available in a movie library that can be accessed and viewed by the user (e.g., the Turner Classics Film Library or Pay-Per-View programs, such as sporting events or movies). Alternatively, the program listings can be related to digital programming. In this aspect of the invention, the television program is available to access or download for an extended period of time rather than being scheduled as a single live event. Thus, a digital archive of movies, program shows or previously played sporting events can be available to the user. This digital archive may be available through a database directly coupled to the electronic program guide, or on a remote database, such as the World Wide Web, Internet, or the like. In this embodiment, the television guide may be used to both: (1) show when the television programs are first available to the user (i.e., a schedule); and (2) list the shows that have been digitally recorded and, therefore, are available to the user at any time.

In one example of this embodiment, a Jerry Seinfeld fan can browse through a list of previously played Jerry Seinfeld episodes. The episodes can be arranged chronologically, by subject matter, or other convenient methods. Upon reaching one of the episodes in the list, the user may then find out more information about the episode, such as a brief abstract on the episode, when it was first made available to the public, etc. Alternatively, the user may contextually link with other databases, such as the Internet or World Wide Web, to find out more information about the program (e.g., chat with other Jerry Seinfeld fans, read reviews on that particular episode, etc) If the user wishes to play or record the episode, the user may do so by the methods described above.

What is claimed is:

1. An interactive television system having a display screen comprising:

means for storing television schedule information including television program titles;

means for displaying some of the schedule information including television program titles on the screen;

means for selecting one of the displayed television program titles;

a plurality of Internet data sources, each data source having a unique address;

means responsive to the television program title selecting means for searching the Internet to identify one or more data sources from the plurality of Internet data sources having data contextually related to the selected television program title;

means for selecting a data source from the one or more identified data sources having data contextually related to the selected television program title;

means responsive to the data source selecting means for establishing a link to the selected data source according to the unique address of the selected data source;

means for searching the linked data source for the data contextually related to the selected television program title; and means for displaying the data from the linked data source on the screen.

2. The interactive television system of claim 1, in which the selected title is tuned to for viewing and the one or more identified data sources have data contextually related to the television program being viewed.

3. The interactive television system of claim 1 further comprising:

means for monitoring and storing the viewer's selections of television programs;

means for heuristically learning the viewer's preferences according to the viewer's selections of television programs; and means for automatically customizing the operation of the interactive television system according to the learned viewer's preferences.

4. The interactive television system of claim 3, in which the customizing means comprises of means for reminding the viewer to view a preferred television program, means for recording a preferred television program when it is broadcast, means for designating a television program as a favorite, or means for downloading a copy of a preferred television program to a digital storage medium when the preferred television program is broadcast.

5. The interactive television system of claim 3, in which the customizing means comprises of means for adapting the schedule information displayed on the screen according to the viewer's preferences.

6. The interactive television system of claim 3, in which the customizing means comprises of means for automatically searching a database for other television programs having the same viewer's preferences.

7. The interactive television system of claim 3, in which the customizing means comprises of means for adapting the plurality of Internet data sources, according to the viewer's learned preferences.

8. The interactive television system of claim 1 further comprising:

means for storing the viewer's preferences for television programs based on criteria responsive to an interactive user interface; and means for customizing the operation of the interactive television system according to the criteria.

9. The interactive television system of claim 8, in which the customizing means comprises of means for reminding the viewer to view a preferred television program, means for recording a preferred television program when it is broadcast, means for designating a television program as a favorite, or means for downloading a copy of a preferred television program to a digital storage medium when the preferred television program is broadcast.

10. The interactive television system of claim 8, in which the customizing means comprises of means for adapting the television schedule information displayed on the screen according to the viewer's preferences.

11. The interactive television system of claim 8, in which the customizing means comprises of means for automatically searching a database for other television programs having the same viewer's preferences.

12. The interactive television system of claim 8, in which the customizing means comprises of means for adapting the plurality of Internet data sources, according to the viewer's preferences.

13. The interactive television system of claim 1, in which the means for selecting a television program title includes means for recording the selected television program when broadcast.

14. The interactive television system of claim 1, in which data contextually related to the selected television program title includes a plurality of the selected television program actors, actresses, theme, other broadcast times or sources, associated available products, advertisements, promotions, and other related information.

15. The interactive television system of claim 1, further comprising:

means for displaying preview programming for a future-scheduled television program;

means for identifying a plurality of on-line services, databases, websites, or other sources of information containing data contextually related to the future-scheduled television program;

means for selecting an on-line service, database, website, or another source of information containing data contextually related to the future-scheduled television programs from the identified plurality of on-line services, databases, websites, or other sources of information containing data contextually related to the future-scheduled television program;

means responsive to the on-line service selecting means for establishing a link to the selected on-line service; and means for displaying data from the linked on-line service on the screen.

16. The interactive television system of claim 1, further comprising means for storing and displaying advertisement data.

17. An interactive television system having a display screen comprising:

means for storing television schedule information including television program titles;

means for displaying some of the schedule information including television program titles on the screen;

means for selecting one of the displayed television program titles;

a plurality of Internet data sources, each data source having a unique address;

means responsive to the television program title selecting means for searching the Internet to identify and establish a link to a data source having data contextually related to the selected television program title according to the unique address of the data source; and means for displaying data from the linked data source on the screen.

18. The method of claim 12, further comprising:

monitoring and storing the viewer's selections of television programs;

heuristically learning the viewer's preferences according to the viewer's selections of television programs; and automatically customizing the operation of the interactive television system according to the learned viewer's preferences.

19. An interactive television system having a display screen comprising:

means for storing television schedule information including television program titles;

means for displaying some of the schedule information including television program titles on the screen;

means for selecting one of the displayed television program titles;

a plurality of Internet data sources, each data source having a unique address;

means responsive to the television program title selecting means for searching the Internet to identify and establish a link to a data source having data contextually related to the selected television program title according to the unique address of the data source; and means for displaying data from the linked data source on the screen.

* * * * *

UNITED STATES PATENT AND TRADEMARK OFFICE
CERTIFICATE OF CORRECTION

PATENT NO. : 6,002,394
DATED : December 14, 1999
INVENTOR(S) : Steven M. Schein; Sean A. O'Brien;
James Jay Leftwich; Susan Broughton It is certified that error appears in the above-identified patent and that said Letters Patent is hereby corrected as shown below:

On the title page, Item [57],
Abstract, line 6, replace "televisions screens" with --television screens--.
FIG. 9, Sheet 7 of 26, replace "INDECIES(k)" with --INDICES(k)--.
FIG. 17B, Sheet 15 of 26, replace "VIKINKS" with --VIKINGS--.
FIG. 18B, Sheet 17 of 26, replace "Brad Pit" with --Brad Pitt--.
FIG. 19C, Sheet 20 of 26, replace "BUSINES" with --BUSINESS--.
Column 1, line 61, replace "their" with --there--.
Column 2, line 27, replace "televisions screens" with --television screens--.
Column 3, line 43, replace "and them" with --and theme--.
Column 4, line 52, before "schedule" insert --a--.
Column 5, lines 27,28, replace "applications Ser. Nos." with
    --application Ser. Nos.--.
Column 6, line 32, replace "computers display devices" with
    --computer display devices--.
Column 7, line 3, after "is received" insert a comma.
Column 7, lines 7,8, after "images" delete "are generated".
Column 7, line 60, replace "new" with --news--.
Column 9, line 18, replace "the generates" with --then generates--.
Column 11, line 4, before "identify" insert --to--.
Column 11, line 31, replace "them user" with --theme user--.
Column 12, line 17, after "onto" delete "an".
Column 12, line 45, replace "decoder chips decompress compressed" with
    --decoder chips that decompress the compressed--.
Column 12, line 47, after "guide" insert a comma.
Column 12, line 56, replace "d5+dG+d7" with --d5+d6+d7--.
Column 13, line 43, replace "need" with --needed--.

UNITED STATES PATENT AND TRADEMARK OFFICE
CERTIFICATE OF CORRECTION

PATENT NO. : 6,002,394
DATED : December 14, 1999
INVENTOR(S) : Steven M. Schein; Sean A. O'Brien;
James Jay Leftwich; Susan Broughton It is certified that error appears in the above-identified patent and that said Letters Patent is hereby corrected as shown below:

Column 14, line 10, replace "televisions show" with --television show--.
Column 14, line 35, after "choice." delete the parenthesis.
Column 15, line 3, replace "a electronic" with --an electronic--.
Column 18, line 45, replace "a websites" with --websites--.
Column 21, line 24, replace "a input" with --an input--.
Column 25, line 5, replace "etc)" with --etc.).--.
Column 26, lines 64-67 through column 27, line 15, delete claim 17 and insert therefor:

--17. A method for managing and displaying information in an interactive television system having a display screen comprising the steps of:

storing television schedule information including television program titles;

displaying some of the schedule information including television program titles on the screen;

selecting one of the displayed television program titles;

responsive to the television program title selection, searching the Internet to identify one or more Internet data sources, having data contextually related to the selected television program title:

selecting a data source from the one or more identified Internet data sources having data contextually related to the selected television program title;

responsive to the data source selecting step, establishing a link to the selected data source; and displaying data from the linked data source on the screen.--

UNITED STATES PATENT AND TRADEMARK OFFICE
CERTIFICATE OF CORRECTION

PATENT NO. : 6,002,394
DATED : December 14, 1999
INVENTOR(S) : Steven M. Schein; Sean A. O'Brien; James Jay Leftwich; Susan Broughton It is certified that error appears in the above-identified patent and that said Letters Patent is hereby corrected as shown below:

Column 27, line 15, replace "claim 12" with --claim 17--.

Signed and Sealed this

Thirteenth Day of February, 2001

*Attest:*

NICHOLAS P. GODICI

*Attesting Officer*  Acting Director of the United States Patent and Trademark Office